United States Patent [19]
Yagi et al.

[11] Patent Number: 4,870,136
[45] Date of Patent: Sep. 26, 1989

[54] MOLECULAR ORIENTED, SILANE-CROSSLINKED ULTRA-HIGH-MOLECULAR-WEIGHT POLYETHYLENE MOLDED ARTICLE AND PROCESS FOR PREPARATION THEREOF

[75] Inventors: Kazuo Yagi, Ohtake; Hitoshi Mantoku, Iwakuni, both of Japan

[73] Assignee: Mitsui Pertrochemical Industries, Ltd., Tokyo, Japan

[21] Appl. No.: 934,701

[22] Filed: Nov. 25, 1986

[30] Foreign Application Priority Data

Nov. 30, 1985 [JP] Japan .................. 60-268356
Oct. 8, 1986 [JP] Japan .................. 61-237887

[51] Int. Cl.$^4$ ........................... C08F 255/02
[52] U.S. Cl. .................. 525/288; 264/210.2; 264/210.4; 264/210.6; 525/342
[58] Field of Search .............. 525/288, 342; 264/210.2, 210.4, 210.6

[56] References Cited

U.S. PATENT DOCUMENTS

| | | | |
|---|---|---|---|
| 3,646,155 | 2/1972 | Scott | 260/827 |
| 4,136,132 | 1/1979 | Poole | 525/288 |
| 4,422,993 | 12/1983 | Smith et al. | 264/210.8 |
| 4,430,383 | 2/1984 | Smith et al. | 428/364 |
| 4,545,950 | 10/1985 | Motooka et al. | 264/210.6 |

FOREIGN PATENT DOCUMENTS

| | | | |
|---|---|---|---|
| 52-154872 | 12/1977 | Japan . | |
| 0104673 | 9/1978 | Japan | 264/210.6 |
| 57-005913 | 1/1982 | Japan . | |
| 0037391 | 3/1983 | Japan | 525/288 |

Primary Examiner—Wilbert J. Briggs, Sr.
Attorney, Agent, or Firm—Sherman and Shalloway

[57] ABSTRACT

If ultra-high-molecular-weight polyethylene having an intrinsic viscosity ($\eta$) of at least 5 dl/g is grafted with a silane compound in the presence of a radical initiator and extrusion-molded and the extrudate is impregnated with a silanol condensation catalyst after or during drawing and is then exposed to water to effect crosslinking, there is obtained a novel molecularly oriented molded articles in which increase of the melting temperature, which is not observed in conventional draw-molded or crosslinked molded articles of polyethylene, can be attained, and even if this molecularly oriented molded article is exposed to a temperature of 180° C. for 10 minutes, the molded article is not fused but the shape is retained and even after this heat history, a high strength retention ratio can be maintained. In this draw-molded article, the adhesiveness and creep resistance are prominently improved while high elastic modulus and high tensile strength inherent to a draw-molded article of ultra-high-molecular-weight polyethylene are retained.

11 Claims, 11 Drawing Sheets

MOLECULAR ORIENTED, SILANE-CROSSLINKED ULTRA-HIGH-MOLECULAR-WEIGHT POLYETHYLENE MOLDED ARTICLE AND PROCESS FOR PREPARATION THEREOF

BACKGROUND OF THE INVENTION (1) Field of the Invention

The present invention relates to a molecularly oriented, silane-crosslinked ultra-high-molecular-weight polyethylene molded article and a process for the preparation thereof. More particularly, the present invention relates to a molded article which has high elastic modulus and high tensile strength inherent to a draw-molded article of ultra-high-molecular-weight polyethylene and which is prominently improved in heat resistance and adhesiveness, and a process for the preparation thereof.

(2) Description of the Prior Art

It is known that a molecularly oriented molded article having high elastic modulus and high tensile strength can be obtained by shaping ultra-high-molecular-weight polyethylene into a fiber, a tape or the like and drawing the shaped article. For example, Japanese Patent Application Laid-Open Specification No. 15408/81 teaches that a dilute solution of ultra-high-molecular-weight polyethylene is spun and the obtained filament is drawn. Furthermore, Japanese Patent Application Laid-Open Specification No. 130313/84 teaches that ultra-high-molecular-weight polyethylene is melt-kneaded with a wax, the kneaded mixture is extruded, cooled and solidified and the solidified extrudate is drawn. Moreover, in Japanese Patent Laid-Open Specification No. 187614/84, it is taught that a melt-kneaded mixture as described above is extruded and the extrudate is drafted, cooled and solidified, and then drawn.

Separately, it is known that a polyolefin is crosslinked with a silane to improve a heat resistance and the like to the polyolefin. For example, Japanese Patent Publication No. 1711/73 teaches a process in which a silane compound is grafted to polyethylene in the presence of a radical generator and the grafted polyethylene is crosslinked by exposing it to water in the presence of a silance condensation catalyst. Furthermore, Japanese Patent Application Laid-Open Specification No. 11154/79 teaches that a silane-grafted polyolefin molded article is dipped in a liquid mixture of a silanol condensation catalyst and a solvent to expedite the crosslinking treatment, and Japanese Patent Application Laid-Open Specification No. 154872/77 teaches that a molecularly oriented, silane-grafted polyolefin is cross-linked and is then subjected to an extraction treatment.

A draw-molded article of ultra-high-molecular-weight polyethylene, for example, a fiber or tape, has high elastic modulus and high tensile strength, is light in the weight and is excellent in water resistance and weatherability, but it still has inherent defects of polyethylene, that is, poor heat resistance and poor adhesiveness.

Moreover, according to the conventional technique of crosslinking polyethylene with a silane, a draw-molded article having high elastic modulus and high tensile strength cannot be obtained, and the effect of improving the heat resistance is insufficient.

It is known that if polyethylene is molecularly oriented or crosslinked, the heat resistance of polyethylene is generally improved. However, according to this conventional technique, the improvement of the heat resistance is limited, and the inherent defect of polyethylene, that is, the relatively low melting point of 110° to 140° C., cannot be overcome, and so far as we know, most of molded articles of polyethylene are fused if they are exposed to a temperature of 180° C. for 10 minutes, and the strength is lost.

SUMMARY OF THE INVENTION

It is therefore a primary object of the present invention to provide a molecularly oriented ultra-high-molecular-weight polyethylene molded article which is highly improved in heat resistance, adhesiveness and creep resistance.

Another object of the present invention is to provide a molecularly oriented, silane-crosslinked ultra-high-molecular-weight polyethylene molded article which has such a high heat resistance that it is not fused but retains its shape even if it is exposed to a temperature of 180° C. for 10 minutes and even after this heat history, a high strength retention ratio is maintained.

Still another object of the present invention is to provide a silane-crosslinked ultra-high-molecular-weight polyethylene molded article which has a combination of heat resistance, adhesiveness and creep resistance suitable for use as a reinforcing fiber for a composite resin material, and a process for the preparation thereof.

We found that if ultra-high-molecular-weight polyethylene having an intrinsic viscosity ($\eta$) of at least 5 dl/g is grafted with a silane compound in the presence of a radical initiator and extrusion-molded and the extrudate is impregnated with a silanol condensation catalyst after or during drawing and is then exposed to water to effect crosslinking, there is obtained a novel molecularly oriented molded article in which increase of the melting temperature, which is not observed in conventional draw-molded or crosslinked molded articles of polyethylene, can be attained, and that even if this molecularly oriented molded article is exposed to a temperature of 180° C. for 10 minutes, the molded article is not fused but the shape is retained and even after this heat history, a high strength retention ratio can be maintained. It also was found that in this draw-molded article, the adhesiveness and creep resistance are prominently improved while high elastic modulus and high tensile strength inherent to a draw-molded article of ultra-high-molecular-weight polyethylene are retained.

In accordance with one fundamental aspect of the present invention, there is provided a molecularly oriented, silane-crosslinked ultra-high-molecular-weight polyethylene molded article, wherein when the molded article is analyzed in the constrained state by a differential scanning calorimeter, at least two crystal-melting peaks (Tp) appear at temperatures higher by at least 10° C. than the inherent crystal-melting temperature (Tm) of the ultra-high-molecular-weight polyethylene obtained as the main melting peak at the second temperature elevation and the melting calorific value of the crystal-melting peaks (Tp) is at least 50% of the total melting calorific value, and the sum of calorific values of high temperature side melting peaks (Tp1) appearing at temperatures in the range of from (Tm+35° C.) to (Tm+120° C.) is at least 5% of the total melting calorific value.

In accordance with another aspect of the present invention, there is provided a process for the preparation of a molecularly-oriented, silane-crosslinked ultra-high-molecular-weight polyethylene molded article, which comprises heat-molding a composition comprising ultra-high-molecular-weight polyethylene having an intrinsic viscosity ($\eta$) of at least 5 dl/g, a silane compound, a radical initiator and a diluent, drawing the silane compound-grafted ultra-high-molecular-weight polyethylene molded article, impregnating the drawn molded article with a silanol condensation catalyst during or after drawing, and contacting the drawn molded article with water to effect crosslinking.

DETAILED DESCRIPTION OF THE PREFERRED EMBODIMENTS

The present invention is based on the surprising finding that if ultra-high-moleclar-weight polyethylene is grafted with a silane and molded and the molded article is drawn and then crosslinked with a silane, the melting point of at least a part of the polymer chain constituting the drawn crosslinked molded article is elevated under constraining conditions.

The melting point of a polymer depends on the melting of a crystal in the polymer and is generally measured as the temperature of the endothermic peak generated by the melting of the crystal by a differential scanning calorimeter. The endothermic peak temperature is constant in the same kind of polymers, and the endothermic peak temperature is hardly changed by a post treatment such as drawing or crosslinking, and if changed, the endothermic peak temperature rises by about 15° C. at a draw-heat treatment which is known to bring a largest change of the endothermic peak temperature.

FIGS. 1 through 4 show endothermic curves of starting ultra-high-molecular-weight polyethylene (FIG. 1), a drawn filament of said polyethylene (FIG. 2), an undrawn filament of said polyethylene crosslinked with a silane (FIG. 3) and a filament obtained by drwaing silane-grafted ultra-high-molecular-weight polyethylene and crosslinking the drawn filament according to the present invention (FIG. 4), determined under constraining conditions by a differential scanning calorimeter. Incidentally, the treatment conditions are described in the examples given hereinafter.

From the results shown in FIGS. 1 through 4, it is seen that if ultra-high-molecular-weight-polyethylene is merely drawn or crosslinked with a silane, the obtained product shows an endothermic peak attributed to the melting of a crystal at about 135° C., which is substantially the same as the endothermic peak temperature of the untreated ultra-high-molecular-weight polyethylene, and in the silane-crosslinked product, the peak area (melting calorific value) is smaller than the peak area of the untreated polyethylene. On the other hand, it is seen that in the drawn, crosslinked, molded article according to the present invention, a small peak is left at the position of the melting peak temperature of the untreated ultra-high-molecular-weight polyethylene but a large peak shifts to the high temperature side.

Figure 4:
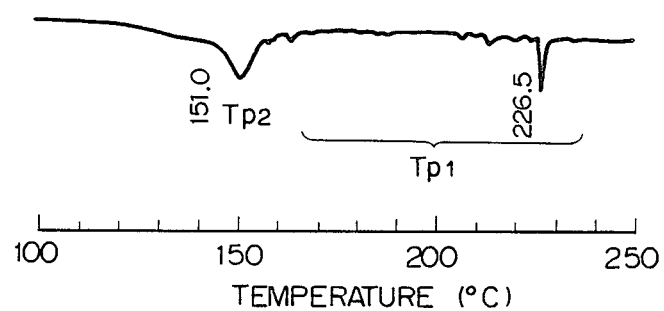
FIG. 4 is a graph illustrating the melting characteristics of a drawn filament obtained by silane-grafting, drawing and then crosslinking the ultra-high-molecular-weight polyethylene shown in FIG. 1.
Figure 5:
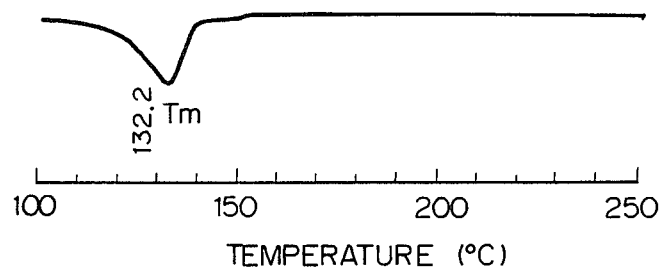
FIG. 5 is a graph illustrating the melting characteristics observed when the sample shown in FIG. 4 is subjected to the second temperature elevation measurement.

FIG. 5 shows the endothermic curve observed when the sample of FIG. 4 is subjected to the second run (the second temperature elevation measurement after the measurement of FIG. 4). From the results shown in FIG. 5, it is seen that when the temperature is elevated again, the main peak of the melting of the crystal appears at substantially the same temperature as the melting peak temperature of the untreated ultra-high-molecular-weight polyethylene and at the measurement of FIG. 5, the molecular orientation in the sample substantially disappears. Accordingly, it is understood that the shift of the endothermic peak to the high temperature side in the sample of FIG. 4 has a close relation to the molecular orientation in the molded article.

The fact that according to the present invention, by drawing and crosslinking of ultra-high-molecular-weight polyethylene, the crystal melting temperature of at least a part of the polymer chain constituting the molded article is changed to the high temperature side is an unexpected and novel finding since means for elevating the crystal melting temperature has not been known.

The reason why the crystal melting temperature shifts to the high temperature side in the oriented, crosslinked, molded article of the present invention has not been completely elucidated. However, it is presumed that the reason may be as follows. More specifically, when silane-grafted ultra-high-molecular-weight polyethylene is subjected to the drawing operation, the silane-grafted portion is selectively made amorphous and an oriented crystal portion is formed through this amorphous portion. If this draw-molded article is crosslinked in the presence of a silanol condensation catalyst, a crosslinked structure is selectively formed in the amorphous portion and both the ends of the oriented crystal portion are fixed by the silane crosslinking. In an ordinary draw-molded article, the crystal melting is advanced from the amorphous portions on both the ends of the oriented crystal portion. On the other hand, in the drawn, crosslinked, molded article of the present invention, the amorphous portions on both the ends of the oriented crystal portion are selectively crosslinked and the movement of the polymer chain is restricted, with the result that the melting temperature of the oriented crystal portion is elevated.

Figure 6:
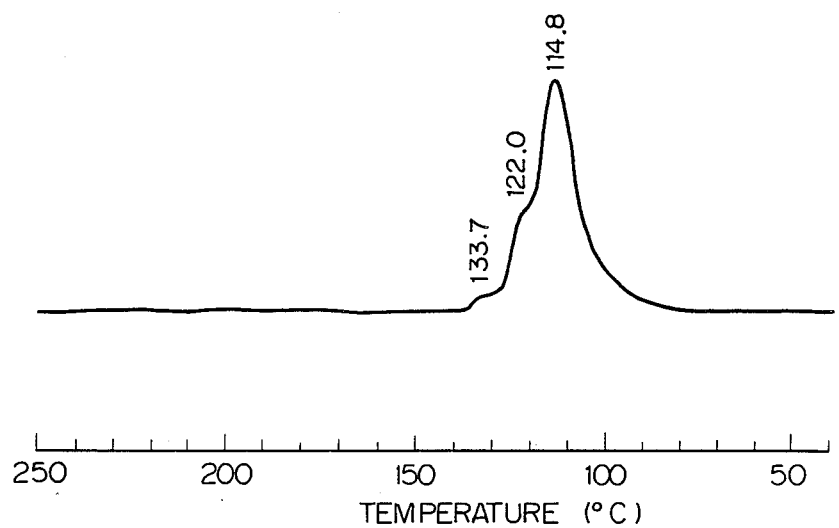
FIG. 6 is a graph illustrating the crystallizing characteristics observed when the sample shown in FIG. 4 is subjected to the first temperature reduction measurement.

The following characteristics are further found in the above-mentioned structure of the molded article of the present invention from the results of the measurement by the differential scanning calorimeter. FIG. 6 shows an exothermic curve observed at the time of crystallization, which is determined at the temperature-reducing course intermediate between the measurement at elevated temperatures, shown in FIG. 4, and the measurement at elevated temperatures, shown in FIG. 5, that is, the second run measurement. In FIG. 6, a shoulder or broad subsidiary peak is observed at a temperature higher than the temperature of the main exothermic peak. Also at the second temperature elevation of the second run (FIG. 5), a shoulder is observed at a temperature higher than the temperature of the Tm peak. In ordinary polyethylene, one sharp exothermic peak is observed during the cooling course from the molten state, and no shoulder or peak is observed at a temperature higher than the temperature of this exothermic peak. In ordinary crosslinked polyethylene, no shoulder or peak is observed at a temperature higher than the temperature of the exothermic peak though the peak is sometimes broadened. In ordinary polyethylene or crosslinked polyethylene at the second temperature elevation of the second run, the presence of an endothermic peak or shoulder at a temperature higher than Tm is not observed at all. Namely, this specific thermal behavior is a proof of the novel oriented and crosslinked structure and it is considered that this specific thermal behavior has a relation to the improvement of the heat resistance and creep resistance.

Accordingly, the molded article of the present invention can retain its shape stably at such a high temperature as 160° C. and even after this heat history, the strength retention ratio is maintained at a high level.

The present invention will now be described in detail with reference to the starting material, treatment means and intended product.

Starting Material

The ultra-high-molecular-weight polyethylene used as the starting material in the present invention has an intrinsic viscosity ($\eta$) of at least 5 dl/g, preferably 7 to 30 dl/g, as measured at 135° C. in decalin as the solvent. If the intrinsic viscosity ($\eta$) is lower than 5 dl/g, a drawn article having a high tensile strength cannot be obtained even if the draw ratio is increased. The upper limit of the intrinsic viscosity ($\eta$) is not particularly critical, but if the intrinsic viscosity ($\eta$) exceeds 30 dl/g, the melt viscosity of the ultra-high-molecular-weight polyethylene is very high at a high concentration and melt fracture is readily caused at the extrusion step, and the melt spinnability is degraded. Among polyethylenes obtained by homopolymerizing ethylene or copolymerizing ethylene with a small amount of other $\alpha$-olefin such as propylene, 1-butene, 4-methyl-1-pentene or 1-hexene by so-called Ziegler polymerization procedures, a polymer having an extremely high molecular weight is meant by the ultra-high-molecular-weight polyethylene.

Any of silane compounds capable of grafting and crosslinking can be optionally used as the silane compound for the grafting treatment. Such silane compounds have not only a radical-polymerizable organic group but also a hydrolyzable organic group, and they are represented by the following general formula:

$$R_nSiY_{4-n} \tag{1}$$

wherein R stands for an organic group having a radical-polymerizable ethylenic unsaturation, Y stands for a hydrolyzable organic group, and n is a number of 1 or 2.

As the radical-polymerizable organic group, there can be mentioned ethylenically unsaturated hydrocarbon groups such as a vinyl group, an allyl group, a butenyl group and a cyclohexenyl group, and alkyl groups having an ethylenically unsaturated carboxylic acid ester unit, such as an acryloxyalkyl group and a methacryloxyalkyl group. A vinyl group is preferred. As the hydrolyzable organic group, there can be mentioned an alkoxy group and an acyloxy group.

As preferred examples of the silane compound, there can be mentioned vinyltriethoxysilane, vinyltrimethoxysilane and vinyltris(methoxyethyoxy)silane, though silane compounds that can be used are not limited to these compounds.

Grafting and Molding

According to the present invention, a composition comprising the above-mentioned ultra-high-molecular-weight polyethylene, the above-mentioned silane compound, a radical initiator and a diluent is heat-molded by melt extrusion or the like to effect silane grafting and molding. More specifically, by the action of the radical initiator and the heat at the melt kneading, polymer radicals are generated in the ultra-high-molecular-weight polyethylene, and by the reaction of the polymer radicals and the silane compound, grafting of the silane compound to the ultra-high-molecular-weight polyethylene is caused.

All of radical initiators customarily used for the grafting treatment of this type can be used as the radical initiator. For example, there may be used organic peroxides and organic peresters such as benzoyl peroxide, dichlorobenzoyl peroxide, dicumyl peroxide, di-tert-butyl peroxide, 2,5-di(peroxidobenzoato)hexine-3, 1,4-bis(tert-butylperoxyisopropy)benzene, lauroyl peroxide, tert-butyl peracetate, 2,5-dimethyl-2,5-di(tert-butyl-peroxy)hexine-3, 2,5-dimethyl-2,5-di(tert-butylperoxy)-hexane, tert-butyl perbenzoate, tert-butyl perphenylacetate, tert-butyl perisobutyrate, tert-butyl per-sec-octoate, tert-butyl perpivalate, cumyl perpivalate and tert-butyl benzylethylacetate, and azo compounds such as azobisisobutyronitrile and dimethyl azoisobutylate. In order to effectively perform grafting of the ultra-high-molecular-weight polyethylene under melt-kneading conditions, it is preferred that the half-value period temperature of the radical initiator be 100° to 200° C.

In the present invention, in order to make melt-molding of the silane-grafted ultra-high-molecular-weight polyethylene possible, a diluent is incorporated together with the above-mentioned ingredients. As the diluent, there can be used as a solvent for the ultra-high-molecular-weight polyethylene and a wax compatible with the ultra-high-molecular-weight polyethylene.

It is preferred that the boiling point of the solvent used be higher than the melting point of the ultra-high-molecular-weight polyethylene and especially higher by at least 20° C. than the melting point of the ultra-high-molecular-weight polyethylene.

As specific examples of the solvent, there can be mentioned aliphatic hydrocarbon solvents such as n-nonane, n-decane, n-undecane, n-dodecane, n-tetradecane, n-octadecane, liquid paraffin and kerosene, aromatic hydrocarbon solvents such as xylene, naphthalene, tetralin, butylbenzene, p-cymene, cyclohexylbenzene, diethylbenzene, pentylbenzene, dodecylbenzene, bicyclohexyl, decalin, methylnaphthalene and ethylnaphthalene, hydrogenated derivatives of these aromatic hydrocarbon solvents, halogenated hydrocarbon solvents such as 1,1,2,2-tetrachloroethane, pentachloroethane, hexachloroethane, 1,2,3-trichloropropane, dichlorobenzene, 1,2,4-trichlorobenzene and bromobenzene, and mineral oils such as paraffinic process oil, naphthenic process oil and aromatic process oil.

Aliphatic hydrocarbon compounds and derivatives thereof are used as the wax.

As the aliphatic hydrocarbon compound, there can be mentioned so-called paraffin wax composed mainly of a saturated aliphatic hydrocarbon, which has a molecular weight lower than 2000, preferably lower than 1000, especially lower than 800. As the aliphatic hydrocarbon compound, there can be mentioned n-alkanes having at least 22 carbon atoms such as docosane, tricosane, tetracosane and triacontane, mixtures of these n-alkanes with lower n-alkanes, so-called paraffin wax separated and purified from petroleum, medium-pressure, low-pressure and high-pressure polyethylene waxes and ethylene copolymer waxes obtained by homopolymerizing ethylene or copolymerizing ethylene with other α-olefin, waxes obtained by thermal degradation of polyethylene such as medium-pressure, low-pressure or high-pressure polyethlene to reduce the molecular weight, and oxidized waxes and maleic acid-modified waxes obtained by oxidizing or maleic acid-modifying the foregoing waxes.

As the aliphatic hydrocarbon compound derivative, there can be mentioned compounds having at least one, preferably one or two, especially preferably one, of a functional group such as a carboxyl, hydroxyl, carbamoyl, ester, mercapto or carbonyl group at the end or interior of an aliphatic hydrocarbon group (an alkyl group, an alkenyl group or the like). As specific examples, there can be mentioned fatty acids, aliphatic alcohols, fatty acid amides, fatty acid esters, aliphatic mercaptans, aliphatic aldehydes and aliphatic ketones having at least 8 carbon atoms, preferably 12 to 50 carbon atoms, and a molecular weight of 130 to 2000, preferably 200 to 800.

As the fatty acid, there can be mentioned capric acid, lauric acid, myristic acid, palmitic acid, stearic acid and oleic acid, and as the aliphatic alcohol, there can be mentioned lauryl alcohol, myristyl alcohol, cetyl alcohol and stearyl alcohol. As the fatty acid amide, capric amide, lauric amide, palmitic amide and stearic amide, and as the fatty acid ester, there can be mentioned stearyl acetate.

In the present invention, per 100 parts by weight of the ultra-high-molecular-weight polyethylene, the silane compound is used in an amount of 0.1 to 10 parts by weight, especially 0.2 to 5.0 parts by weight, the radical initiator is used in a catalytic amount, generally 0.01 to 3.0 parts by weight, especially 0.05 to 0.5 part by weight, and the diluent is used in an amount of 9900 to 33 parts by weight, especially 1900 to 100 parts by weight. If the amount of the silane compound is smaller than the above-mentioned range, the crosslinking density of the final drawn, crosslinked, molded article is too low and the intended elevation of the crystal melting temperature is hardly attained. On the other hand, if the amount of the silane compound exceeds the above-mentioned range, the crystallization degree of the final drawn, crosslinked, molded article is reduced and the mechanical properties such as elasticity modulus and tensile strength are degraded. Moreover, since the silane compound is expensive, use of a large amount of the silane compound is disadvantageous from the economical viewpoint. If the amount of the diluent is smaller than the above-mentioned range, the melt viscosity becomes too high and melt kneading or melt molding becomes difficult, and the surface roughening is conspicuous in the molded article and breaking is readily caused at the drawing step. On the other hand, if the amount of the diluent exceeds the above range, melt kneading becomes difficult and the drawability of the molded article is degraded.

Incorporation of the respective chemicals into the ultra-high-molecular-weight polyethylene can be performed by optional means. For example, there may be adopted a method in which the silane compound, radical initiator and diluent are simultaneously incorporated into the polyethylene and melt kneading is carried out, a method in which the silane compound and radical initiator are first incorporated into the polyethylene and the diluent is then incorporated, and a method in which the diluent is first incorporated into the ultra-high-molecular-weight polyethylene and the silane compound and radical initiator are then incorporated.

It is preferred that melt kneading be carried out at 150° to 300° C., especially 170° to 270° C. If the temperature is lower than the above range, the melt viscosity is too high and melt molding becomes difficult. If the temperature exceeds the above range, the molecular weight of the ultra-high-molecular-weight polyethylene is reduced by thermal degradation and it becomes difficult to obtain a molded article having high elastic modulus and high strength. The incorporation is accomplished by dry blending using a Henschel mixer or a V-type blender or by melt mixing using a monoaxial or polyaxial extruder.

Melt molding is generally performed by melt extrusion molding. For example, a filament for drawing is obtained by melt extrusion through a spinneret, and a film, sheet or tape for drawing is obtained by extrusion through a flat die or ring die. Furthermore, a pipe (parison) for draw-blow-forming is obtained by extrusion through a circular die. The present invention is especially valuable for the production of a drawn filament. In this case, there may be adopted a method in which the melt from a spinneret is drafted, that is, stretched in the molten state. The draft ratio is defined by the following formula:

Draft ratio = V/Vo (2)

wherein Vo stands for the extrusion speed of the molten resin in the die orifice and V stands for the winding speed of the cooled and solidified, undrawn extrudate.

This draft ratio is generally at least 3, preferably at least 6, though the draft ratio is changed according to the temperature of the mixture, the molecular weight of the ultra-high-molecular-weight polyethylene and the like.

Of course, melt molding is not limited to extrusion molding, and in case of the production of a draw-molded vessel or the like, a preform for draw-blow-forming can be prepared by injection molding. Cooling solidification of the molded article can be accomplished by forced cooling means such as air cooling or water cooling.

Drawing

The so-obtained undrawn molded article of silane-grafted ultra-high-molecular-weight polyethylene is subjected to a drawing treatment. Of course, the drawing treatment temperature is such that the ultra-high-molecular-weight polyethylene constituting the molded article is effectively molecularly oriented in at least one direction.

It is preferred that drawing of the silane-grafted polyethylene molded article be carried out at 40° to 160° C., especially 80° to 145° C. As the heat medium for heating and maintaining the undrawn molded article at the above-mentioned temperature, there can be used any of air, steam and a liquid medium. If a solvent capable of dissolving out and removing the above-mentioned diluent, which has a boiling point higher than the melting point of the composition of the molded article, for example, decalin, decane or kerosene, is used as the heat medium for performing the drawing operation, removal of the diluent becomes possible, and uneven drawing is prevented and a high draw ratio can be attained.

Of course, the means for removing the excessive diluent from the ultra-high-molecular-weight polyethylene is not limited to the above-mentioned method, and according to a method in which the undrawn molded article is treated with a solvent such as hexane, heptane, hot ethanol, chloroform or benzene and is then drawn, or a method in which the drawn molded article is treated with a solvent such as hexane, heptane, hot ethanol, chloroform or benzene, the excessive diluent in the molded article can be effectively removed and a drawn product having high elastic modulus and high strength can be obtained.

The drawing operation can be performed in a single stage or two or more stages. The draw ratio depends on the intended molecular orientation, and ordinarily, satisfactory results can be obtained if the drawing operation is carried out at a draw ratio of 5 to 80, especially 10 to 50.

The monoaxial drawing of a filament, tape or sheet is accomplished by stretching it between rollers differing in the peripheral speed, and a biaxially drawn film can be obtained by stretching a film in the longitudinal direction between rollers differing in the peripheral speed and simultaneously stretching it in the lateral direction by a tenter or the like. Furthermore, the biaxial drawing can be accomplished according to the inflation method. Moreover, in case of a three-dimensional molded article such as a vessel, a biaxially drawn molded article can be obtained by combining stretch drawing in the axial direction with inflation drawing in the circumferential direction.

Crosslinking Treatment

According to the present invention, the molded article is impregnated with a silanol condensation catalyst during or after the drawing and the drawn molded article is then contacted with water to effect crosslinking.

A known silanol condensation catalyst can be used. For example, there can be used dialkyl tin dicarboxylates such as dibutyl tin dilaurate, dibutyl tin diacetate and dibutyl tin octoate, organic titanates such as tetrabutyl titanate, and lead naphthenate. If the undrawn molded article or drawn molded article is contacted with the silanol condensation catalyst in the state dissolved in a liquid medium, the molded article is effectively impregnated with the silanol condensation catalyst. For example, in the case where the drawing treatment is carried out in a liquid medium, the silanol condensation catalyst is dissolved in this liquid medium for drawing, and impregnation of the molded article with the silanol condensation catalyst is accomplished simultaneously with the drawing operation. In the process of the present invention, the diluent contained in the molded article is believed to promote uniform intrusion of the silanol condensation catalyst into the molded article.

The amount of the silanol condensation catalyst intruded into the molded body may be a so-called catalytic amount, and it is difficult to directly measure the amount of the catalyst. In general, however, satisfactory results can be obtained if the silanol condensation catalyst is added in an amount of 10 to 100%, especially 25 to 75% by weight, to the liquid medium, with which the undrawn or drawn molded article is contacted, and the molded article is then contacted with the liquid medium.

The crosslinking treatment of the drawn molded article is performed by contacting the silanol condensation catalyst-impregnated drawn molded article of the silane-grafted ultra-high-molecular-weight polyethylene with water. The crosslinking treatment conditions are not particularly critical. In general, if the treatment temperature is low, a long treatment time is necessary. Accordingly, from the industrial viewpoint, it is preferred that the drawn molded article is contacted with water at 50° to 130° C. for 3 to 24 hours. For this purpose, it is preferred that water is applied in the form of hot water or hot steam to the drawn molded article. If this crosslinking treatment is carried out while placing the drawn molded article under constraining conditions, moderation of the orientation can be prevented, or the orientation may be moderated to some extent by placing the drawn molded article under non-constraining conditions. If the drawn and crosslinked molded article is further drawn (the draw ratio is ordinarily lower than 3), the mechanical strength such as the tensile strength can be further improved.

Molecularly Oriented, Silane-Crosslinked Molded Article

The molecularly oriented, silane-crosslinked ultra-high-molecular-weight polyethylene molded article is surprisingly characterized in that under constraining conditions, the crystal melting peak (Tp) appears at a temperature much higher than the inherent melting temperature (Tm) of the ultra-high-molecular-weight polyethylene.

The inherent crystal melting temperature (Tm) of the ultra-high-molecular-weight polyethylene can be determined at the second run of the so-called differential scanning calorimeter measurement method in which the molded article is once completely molten, the melt is cooled to moderate the molecular orientation in the molded article and the temperature is elevated again.

The constraining conditions mean such conditions that the molded article is not positively strained but the end portions are fixed so that free deformation is not allowed.

As is seen from FIG. 4 mentioned hereinbefore, the molded article of the present invention is characterized in that it has at least two crystal melting peaks (Tp) at temperatures higher by at least 10° C. than the inherent crystal melting temperature (Tm) of the ultra-high-molecular-weight polyethylene and the calorific value based on these crystal melting peaks (Tp) is at least 40%, especially at least 60%, of the total melting calorific value.

As the crystal melting peak (Tp), the molded article of the present invention has, in many cases, two peaks, that is, a high temperature side melting peak (Tp1) appearing at a temperature in the range of from Tm +35° C. to Tm+120° C. and a low temperature side peak (Tp2) appearing at a temperature in the range of from Tm+10° C. to Tm+35° C., and the melting peak at Tm is very small.

Incidentally, the high temperature side peak (Tp1) has a relation of the amount of the grafted silane of the molded article. If the amount of the grafted silane is small, a definite peak does not appear on the melting curve, and broad peak or a shoulder or tail extending on the high temperature side of the low temperature side peak (Tp2), that is, in the range of from Tm+35° C. to Tm+120° C., often appears.

In the case where the melting peak at Tm is extremely small, it often happens that this peak is hidden by the shoulder of the melting peak Tp1 and it is not confirmed. Even if the peak at Tm is not present, the function of the ultra-high-molecular-weight polyethylene molded article is not obstructed. Under certain preparation conditions or melting point-measuring conditions, the high temperature side peak (Tp1) appearing at a temperature of from Tm+35° C. to Tm+120° C. and the low temperature side peak (Tp2) appearing at a temperature of from Tm+10° C. to Tm+35° C. are divided into three or more melting peaks.

These high temperature crystal melting peaks (Tp1 and Tp2) are effective for prominently improving the heat resistance of the ultra-high-moelcular-weight polyethylene, but it is believed that it is the high temperature side melting peak (Tp1) that makes a contribution to the improvement of the strength retention ratio after the heat history at a high temperature.

Accordingly, it is preferred that the sum of the melting calorific value based on the high temperature side melting peak (Tp1) at a temperature of from Tm+35° C. to Tm+120° C. be at least 5%, especially at least 10%, of all the melting calorific values. So far as this condition is satisifed, even if the high temperature side melting peak (Tp1) does not appear as a main projecting peak but appears in the form of an assembly of small peaks or a broad peak, the creep resistance is maintained at a high level, though the heat resistnace is sometimes degraded to some extent.

The above-mentioned shift of the crystal melting peak to the high temperature side is not caused in a drawn polyethylene molded article or a drawn, crosslinked polyethylene molded article, but in the present invention, this shift is accomplished by grafting of the silane to the diluent-containing polyethylene composition, the molecular orientation by drawing and the crosslinking with the silane, which are performed in this order in combination.

In the present invention, the melting point and crystal melting calorific value are determined according to the following methods.

The melting point is measured by a differential scanning calorimeter in the following manner. The differential scanning calorimeter used is Model DSCII supplied by Perkin-Elmer Co. About 3 mg of a sample is wound on an aluminum sheet of 4 mm×4 mm having a thickness of 100 μm and is constrained in the orientation direction. The sample wound on the aluminum sheet is sealed in an aluminum pan to form a measurement sample. The same aluminum sheet as used for winding the sample is sealed in an empty aluminum pan to be placed in a reference holder, whereby the thermal balance is maintained. The sample is first maintained at 30° C. for about 1 minute and the temperature is elevated to 250° C. at a temperature-elevating rate of 10° C./min, and the measurement of the melting point at the first temperature elevation is completed. Then, the sample is maintained at 250° C. for 10 minutes and the temperature is reduced at a temperature-dropping rate of 20° C./min, and the sample is maintained at 30° C. for 10 minutes. Then, the second temperature elevation is effected to 250° C. at a temperature-elevating rate of 10° C./min, and the measurement of the melting point at the second temperature elevation (second run) is completed. The melting point is determined based on the maximum value of the melting peak. In the case where the melting peak appears as a shoulder, tangent lines are drawn at the bending point just on the low temperature side of the shoulder and at the bending point just on the high temperature side of the shoulder, and the intersection point is designated as the melting point.

A base line connecting the points of 60° C. and 240° C. of the endothermic curve is drawn and a vertical line is drawn from the point higher by 10° C. than the inherent crystal melting point (Tm) of the ultra-high-molecular-weight polyethylene at the second temperature elevation. The calorific value of the lower temperature side portion surrounded by these lines is judged as being based on the inherent crystal melting (Tm) of the ultra-high-molecular-weight polyethylene and the calorific value of the high temperature side portion is judged as being based on the crystal melting (Tp) exerting the function of the molded article of the present invention, and these calorific values are calculated from the areas of these portions, respectively. Furthermore, the crystal melting calorific values at Tp1 and Tp2 are similarly calculated by judging the portion surrounded by the vertical line drawn from the point of Tm+10° C. and the vertical line drawn from the point of Tm+35° C. as being based on the melting Tp2 and judging the high temperature side portion as being based on the melting Tp1.

The degree of the molecular orientation can be known by the X-ray diffractometry, the birefringence method, the polarization fluorimetry or the like. In case of the drawn, silane-crosslinked polyethylene fialment of the present invention, in view of the heat resistance and mechanical properties, it is preferred that the orientation degree determined by the half-value width, which is described in degree in Yukichi Go and Kiichiro Kubo, Kogyo Kagaku Zasshi, 39, page 992 (1939), that is, the orientation degree (F) defined by the following formula:

$$\text{Orientation degree F.} = \frac{90° - H°/2}{90°}$$

wherein H° stands for the half-value width (°) of the strength distribution curve along the Debye-Scherrer ring of the strongest paratroop on the equator line, be at least 0.90, especially at least 0.95.

The amount of the grafted silane can be determined by subjecting the drawn, crosslinked, molded article to an extraction treatment in p-xylene at a temperature of 135° C. to remove the unreacted silane and the contained diluent and measuring the amount of Si according to the weight method or atomic absorption spectroscopy. In the present invention, in view of the heat resistance, it is preferred that the amount of the grafted silane be 0.01 to 5% by weight, especially 0.035 to 3.5% by weight, as the content of Si based on the ultra-high-molecular-weight polyethylene. If the amount of the grafted silane is smaller than the above-mentioned range, the crosslinking density is low and the heat resistance is degraded. If the amount of the grafted silane exceeds the above-mentioned range, the crystallinity is reduced and the heat resistance is degraded.

Since the molecularly oriented, silane-crosslinked molded article of the present invention has a crystal melting temperature shifted to the high temperature side in at least a part of the polymer chain as pointed out hereinbefore, the heat resistance is highly improved, and after the heat history at 160° C. for 10 minutes, the strength retention ratio is at least 80%, and it is preferred that after the heat history at 180° C. for 10 minutes, the strength retention ratio be at least 60%, especially at least 80% and after the heat history at 200° C. for 5 minutes, the strength retention ratio be at least 80%. This heat resistance characteristic is not expected from conventional ultra-high-molecular-weight polyethylene.

The heat-resistant creep characteristic of the molded article of the present invention is such that although the uncrosslinked molded article shows an elongation of at least 50% after it has been allowed to stand under a load corresponding to 30% of the breaking load (measured at a temperature of 23° C.) for 1 minute at a temperature of 70° C., the molded article of the present invention shows an elongation lower than 30%, especially lower than 20%, after it has been allowed to stand under the same conditions for 1 minute. Furthermore, the molded article of the present invention shows an elongation lower than 20% after it has been allowed to stand still under a load corresponding to 50% of the breaking load (measured at a temperature of 23° C.) for 1 minute at a temperature of 70° C., although the uncrosslinked molded article is broken by stretching after it has been allowed to stand still under the same conditions for 1 minute.

Since the molded article of the present invention contains the grafted and crosslinked silane, the molded article is excellent in the adhesiveness, especially the adhesiveness to various resins. This fact will become apparent from the examples given hereinafter.

Furthermore, since the molded article of the present invention is composed of the ultra-high-molecular-weight polyethylene and is molecularly oriented, the molded article of the present invention is excellent in the mechanical characteristics, and the molded article of the present invention in the form of a drawn filament has an elastic modulus of at least 20 GPa and a tensile strength of at least 1.2 GPa.

Functional Effects

The molecularly oriented, silane-crosslinked ultra-high-molecular-weight polyethylene molded article is excellent in the combination of heat resistance, mechanical properties and adhesiveness. Accordingly, if the molded article in the form of a filament is used as a reinforcing fiber for various resins such as epoxy resins and unsatruated polyesters and synthetic rubbers, the heat resistance and adhesiveness are apparently improved as compared with a drawn filament of conventional ultra-high-molecular-weight polyethylene. Since this filament has a high strength and a low density, the weight-reducing effect is attained over a molded article prepared by using a conventional glass fiber, carbon fiber, boron fiber, aromatic polyamide fiber or aromatic polyimide fiber. As in case of a composite material using a glass fiber, a composite material comprising this drawn filament of the present invention can be used for the molding operation of a UD (unit directional) laminate, SMC (sheet molding compound) or BMC (bulk molding compound). Accordingly, use of the molded article of the present invention for various composite materials is expected in the fields where a light weight and a high strength are required, for example, for the production of automobile parts, boats, yachts, other structural bodies, electronic circuit substrates and the like.

The present invention will now be described in detail with reference to the following examples that by no means limit the scope of the invention.

EXAMPLE 1

Grafting and Spinning

In 100 parts by weight of ultra-high-molecular-weight polyethylene powder (having an intrinsic viscosity (η) of 8.20 dl/g) where uniformly incorporated 10 parts by weight of vinyltrimethoxysilane (supplied by Shinetsu Kagaku) and 0.1 part by weight of 2,5-dimethyl-2,5-di(tert-butylperoxy)hexane (Perhexa 25B supplied by Nippon Yushi), and then, paraffin wax powder (Luvax 1266 supplied by Nippon Seiro and having a melting point of 69° C.) was added in an amount of 370 parts by weight per 100 parts by weight of the ultra-high-molecular-weight polyethylene. The mixture was melt-kneaded at a temperature of 200° C. by using a screw type extruder (screw diameter=20 mm, L/D=25). Then, the melt was spun from a die having an orifice diameter to complete grafting of the silane. The spun filament was cooled and solidified by air at room temperature with an air gap of 180 cm to obtain a silane-grafted undrawn ultra-high-molecular-weight polyethylene filament. This undrawn yarn had a fineness of 800 denier, and the draft ratio at the spinning step was 36.4. The winding speed was adjusted to 90 m/min.

Determination of Amount of Grafted Silane

About 8 g of the undrawn grafted filament prepared according to the above-mentioned method was dissolved in 200 cc of p-xylene heated and maintained at 135° C. Then, the ultra-high-molecular-weight polyethylene was precipitated in excess of hexane at normal temperature to remove the paraffin wax and unreacted silane compound. The amount of the grafted silane compound was 0.57% by weight as the content of Si determined by the weight method.

Drawing

The grafted undrawn filament spun from the ultra-high-molecular-weight polyethylene composition according to the above-mentioned method was drawn under conditions described below to obtain an oriented drawn filament. Two-staged drawing was carried out in a drawing tank provided with three goddet rollers and containing n-decane as the heat medium. The temperature in the first drawing zone was 110° C. and the temperature in the second drawing zone was 120° C., and the effective length of each drawing zone was 50 cm. At the drawing operation, the rotation speed of the first goddet roller was adjusted to 0.5 m/min and the desired draw ratio was obtained by changing the rotation speed of the third goddet roller. The rotation speed of the second goddet roller was appropriately set within the range where drawing could be performed stably. The draw ratio was calculated from the rotation speed ratio between the first and third goddet rollers.

The obtained filament was dried at room temperature under reduced pressure to obtain a drawn silane-grafted ultra-high-molecular-weight polyethylene filament.

Impregnation with Crosslinking Catalyst

In the case where the silane compound-grafted, oriented ultra-high-molecular-weight polyethylene filament was further crosslinked, a mixture of equal amounts of n-decane and dibutyl tin dilaurate was used as the heat medium for the second drawing tank, and the paraffin wax was extracted out and the filament was impregnated with dibutyl tin dilaurate. The obtained filament was dried at room temperature under reduced pressure until the decane smell was not felt.

Crosslinking

Then, the filament was allowed to stand still in boiling water for 12 hours to complete the crosslinking.

Measurement of Gel Proportion

About 0.4 g of the silane-crosslinked drawn ultra-high-molecular-weight polyethylene filament was charged in an Erlenmeyer flask filled with 200 ml of paraxylene and equipped with a condenser, and the filament was stirred for 4 hours in the boiled state. The insoluble substance was recovered by filtration using a 300-mesh stainless steel net, dried at 80° C. under reduced pressure and weighed to determine the weight of the insoluble substance. The gel proportion was calculated according to the following formula:

Gel proportion (%)=((weight of insoluble substance)/(weight of sample))×100

It was found that the gel proportion of the so-obtained sample was 51.4%.

The tensile elastic modulus, tensile strength and elongation at break were measured by an Instron universal tester Model 1123 (supplied by Instron Co.) at room temperature (23° C.). The sample length between clamps was 100 mm and the pulling speed was set at 100 mm/min. Incidentally, the tensile elastic modulus was the initial elastic modulus. The cross-sectional area necessary for the calculation was determined by measuring the weight and length of the filament and regarding the density of the polyethylene as 0.96 g/cm³.

The properties of the so-called silane-crosslinked, drawn ultra-high-molecular-weight polyethylene filament are shown in Table 1.

TABLE 1

| Sample No. | Sample 1 |
| --- | --- |
| Fineness | 8.3 denier |
| Draw Ratio | 19.4 |
| Strength | 1.55 GPa |
| Elastic Modulus | 40.1 GPa |
| Elongation | 7.5% |

The inherent crystal melting point (Tm) of the ultra-high-molecular-weight polyethylene determined as the temperature of the main melting peak at the second temperature elevation was found to be 132.2° C. The ratio of the melting calorific value based on Tp to the total crystal melting value and the ratio of the melting calorific value based on Tp1 to the total crystal melting calorific value were 73% and 22%, respectively. The temperature of the main component of Tp2 was 151.0° C. and the temperature of the main component of Tp1 was 226.5° C.

Figure 1:
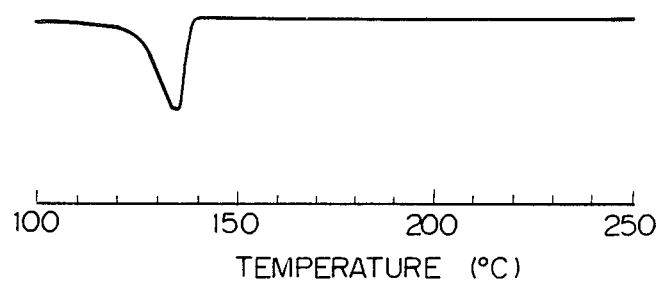
FIG. 1 is a graph illustrating the melting characteristics of starting ultra-high-molecular-weight polyethylene.
Figure 2:
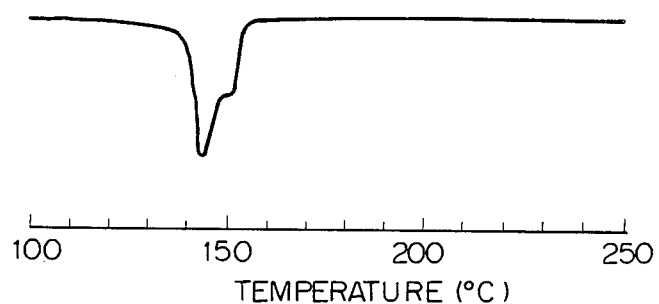
FIG. 2 is a graph illustrating the melting characteristics of a drawn filament of the ultra-high-molecular-weight polyethylene shown in FIG. 1.
Figure 3:
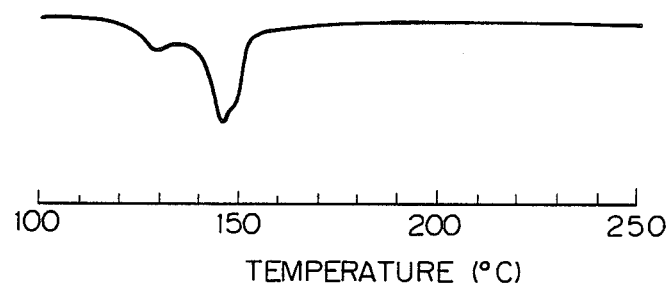
FIG. 3 is a graph illustrating the melting characteristics of an undrawn filament of a silane-crosslinking product of the ultra-high-molecular-weight polyethylene shown in FIG. 1.

FIG. 1 shows the melting characteristic curve of a press sheet having a thickness of 100 μm, obtained at 200° C. from the ultra-high-molecular-weight polyethylene used in Example 1, at the first temperature elevation. FIG. 2 shows a melting characteristic curve of an ungrafted drawn ultra-high-molecular-weight polyethylene filament prepared in Comparative Example 1 described hereinafter. FIG. 3 shows a melting characteristic curve of a sample obtained by extracting out the paraffin wax of the silane-grafted undrawn yarn of Example 1 with hexane at normal temperature, forming the yarn into a pressure sheet by press molding, impregnating the press sheet with dibutyl tin dilaurate and crosslinking the press sheet in the same manner as described in Example 1, at the first temperature elevation. FIG. 4 shows a melting characteristic curve of the silane-crosslinked, drawn ultra-high-molecular-weight polyethylene filament prepared in Example 1 at the first temperature elevation. FIG. 5 shows a melting characteristic curve of the filament of FIG. 4 at the second temperature elevation (second run). FIG. 6 shows a crystallizing characteristic curve of the filament of FIG. 4 at the temperature reduction intermediate between the first temperature elevation and the second temperature elevaton.

Evaluation of Adhesiveness

Figure 7:
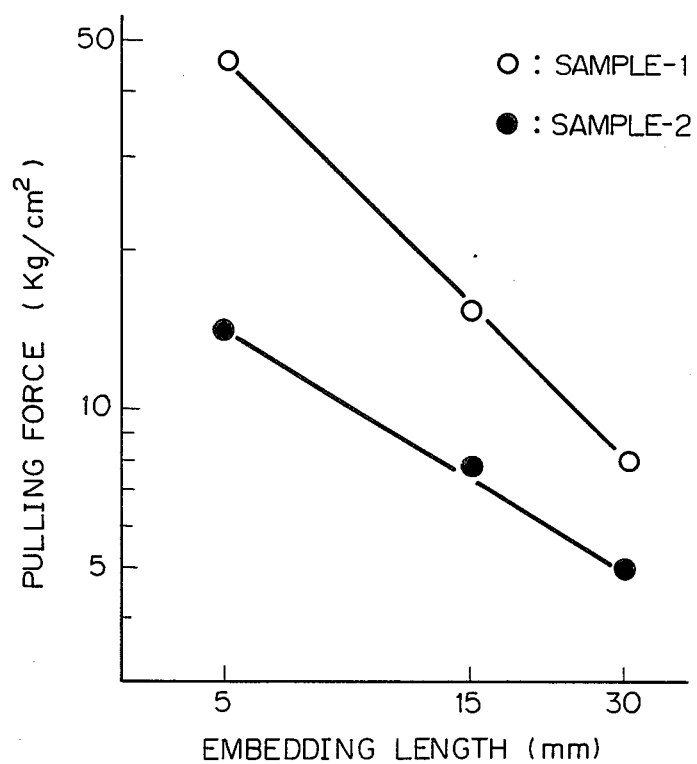
FIG. 7 is a graph illustrating the relation between the embedding length and the pulling force, observed when samples 1 and 2 of Example 1 are subjected to the adhesion test.

The adhesiveness was evaluated according to the pull-out method. Araldite Rapid (epoxy resin supplied by Showa Polymer) was used as the adherend resin, and the test was carried out according to the adhesive force method A (P test) of the test of JIS L-1017 for synthetic fiber tire cords. The obtained results are shown in FIG. 7.

It is seen from FIG. 7 that the silane-crosslinked, drawn ultra-high-molecular-weight polyethylene filament (sample 1) obtained in Example 1 had an adhesive force, (pulling-out force) about 3 times the adhesive force of the drawn ultra-high-molecular-weight polyethylene filament (sample 2) obtained in Comparative Example 1 given hereinafter.

Evaluation of Creep Characteristic

Figure 8:
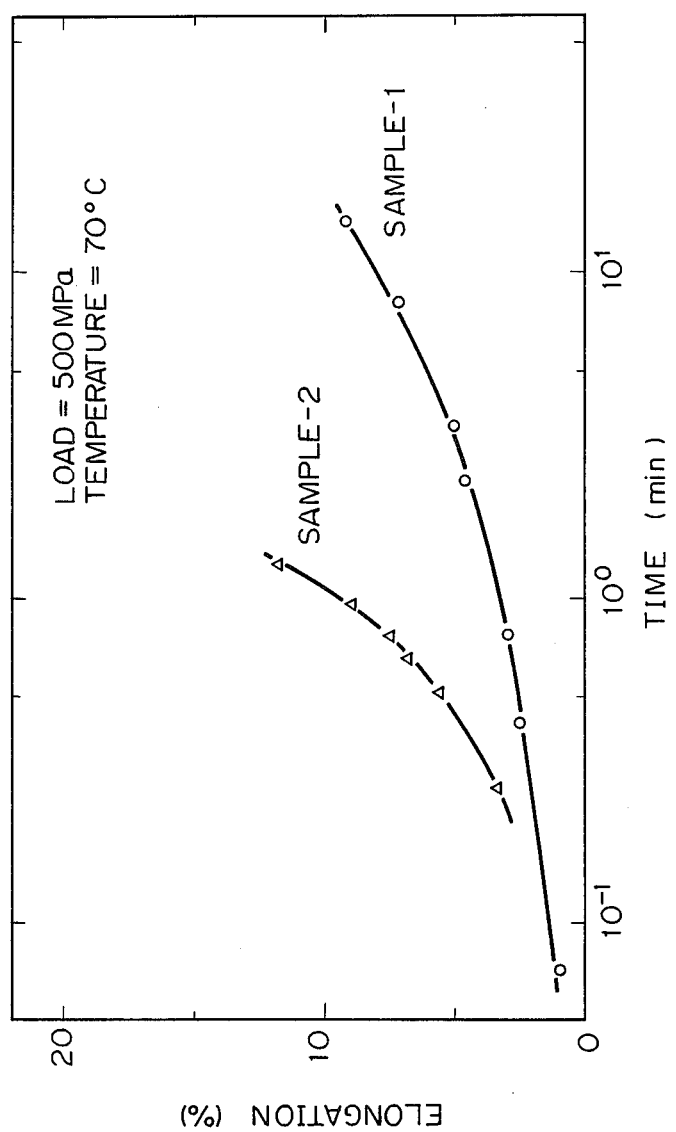
FIGS. 8 and 9 are graphs illustrating the results of the measurement of the creep characteristics of sample 1 of Example 1 and sample 2 of Comparative Example 1 (FIG. 8 shows the results obtained under a load of 500 MPa and FIG. 9 shows the results obtained under a load corresponding to 30% of the breaking load measured at room temperature).
Figure 9:
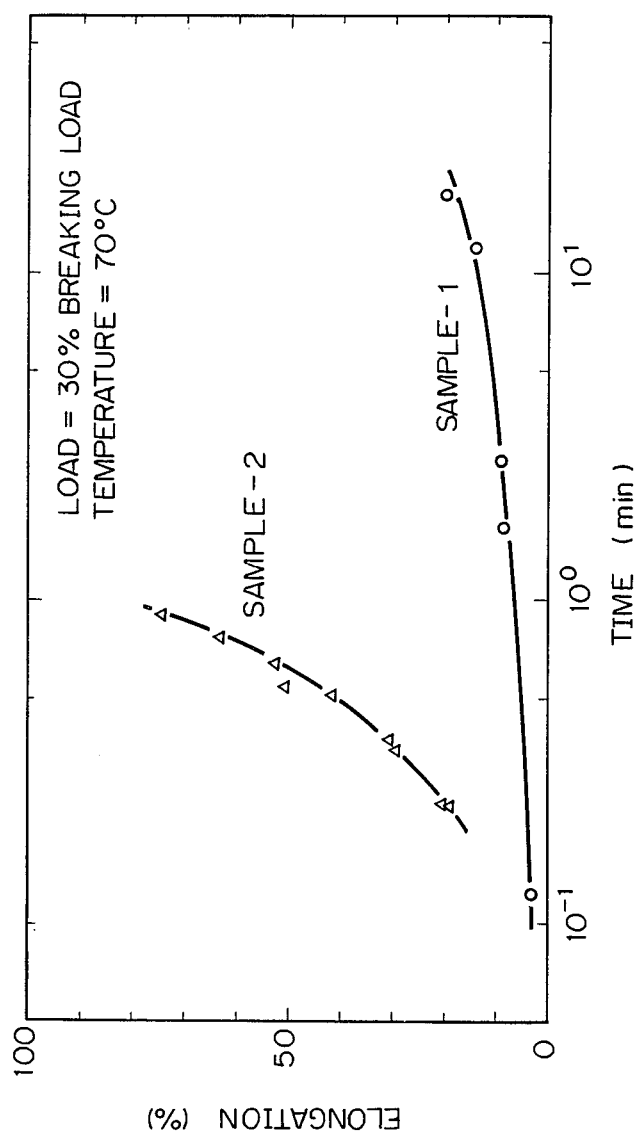

The creep test was carried out at a sample length of 1 cm and an ambient temperature of 70° C. by using a thermal stress strain measurement apparatus Model TMA/SS10 (supplied by Seiko Denshi Kogyo). The results obtained under a load of 500 MPa are shown in FIG. 8 and the results obtained under a load corresponding to 30% of the breaking load are shown in FIG. 9. It is seen that in each case, the silane-crosslinked, drawn ultra-high-molecular-weight polyethylene (sample 1) prepared in Example 1 was highly improved in the creep characteristic over the drawn ultra-high-molecular-weight polyethylene filament (sample 2) obtained in Comparative Example 1 given hereinafter.

The creep test was carried out at an ambient temperature of 70° C. under a load corresponding to 50% of the breaking load at room temperature, and the elongation was measured 1 minute, 2 minutes and 3 minutes after application of the load. The obtained results are shown in Table 2.

TABLE 2

| Sample | Time (minutes) | Elongation (%) |
|---|---|---|
| sample 1 | 1 | 7.4 |
| " | 2 | 8.2 |
| " | 3 | 8.6 |

Strength Retention Ratio after Heat History

The heat history test was carried out by allowing the sample to stand still in a gear oven (Perfect Oven supplied by Tabai Seisakuso). The sample had a length of about 3 m and hung on a stainless steel frame provided with a plurality of pulleys on both the ends, and both the ends of sample were fixed so that the sample was not loosened. A tension was not positively applied to the sample. The obtained results are shown in Table 3.

TABLE 3

| Sample | sample 1 |
|---|---|

TABLE 3-continued

| | |
|---|---|
| Oven temperature | 180° C. |
| Standing time | 10 minutes |
| Strength | 1.53 GPa |
| Strength retention ratio | 99% |
| Elastic modulus | 32.5 GPa |
| Elastic modulus retention ratio | 81% |
| Elongation | 9.5% |
| Elongation retention ratio | 126% |
| Sample | sample 1 |
| Oven temperature | 200° C. |
| Standing time | 5 minutes |
| Strength | 1.40 GPa |
| Strength retention ratio | 90% |
| Elastic modulus | 26.5 GPa |
| Elastic modulus retention ratio | 66% |
| Elongation | 10.7% |
| Elongation retention ratio | 143% |

From Table 3, it is seen that the filament obtained in Example 1 had a surprisingly high strength retention ratio.

Measurement of Orientation Degree by X-Ray Diffractometry

The filament was wound by 10 to 20 turns on a Phillip type holder, and one side was cut and the measurement was made on the bundle-shaped sample. For determining the orientation degree, the reflection on the plane (110) of the polyethylene crystal appearing on the equator line was measured by a diffractometer and the reflection intensity distribution was determined. The calculation was performed according to the above-mentioned method of Go et al. The thus determined orientation degree was 0.955.

Observation of Crystal Melting by Polarization Microscope

Figure 10:
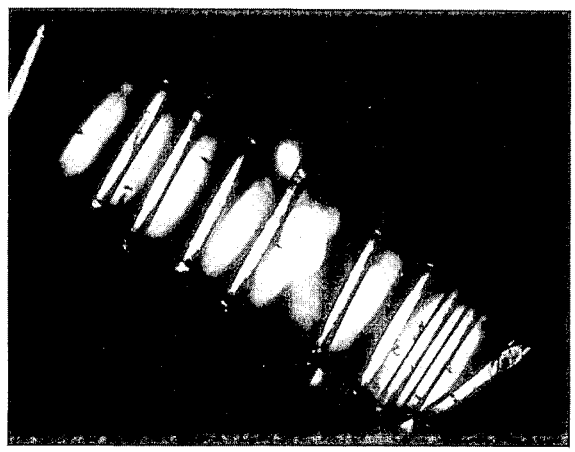
FIG. 10 is a polarization microscope photograph showing the presence of a crystal structure at 200° C. in the molecularly oriented, silane-crosslinked ultra-high-molecular-weight polyethylene filament obtained in Example 1.

A sample for observation was prepared by winding the filament sample on a glass sheet having a width of about 2 mm and a thickness of about 0.5 mm and fixing both the ends. The sample for observation was observed under polarization on a hot stage (Model PF20 supplied by Mettler Co.) by a microscope while elevating the temperature at a temperature-elevating rate of 10° C./min. In case of the silane-crosslinked, drawn ultra-high-molecular-weight polyethylene filament obtained in Example 1, the presence of a crystal was confirmed at 200° C. (FIG. 10), but at 220° C., the field of vision became dark and melting of the crystal was confirmed.

COMPARATIVE EXAMPLE 1

Preparation of Drawn Ultra-High-Molecular-Weight Polyethylene Filament

A mixture of 100 parts by weight of ultra-high-molecular-weight polyethylene (having an intrinsic viscosity $(\eta)$ of 8.20) and 320 parts by weight of the paraffin wax described in Example 1 was spun according to the method described in Example 1. The draft ratio was 25 and the fineness of the undrawn filament was 1000 denier. Then, the filament was drawn in the same manner as described in Example 1 to obtain a drawn filament having the physical properties shown in Table 4.

TABLE 4

| | |
|---|---|
| Sample | sample 2 |
| Fineness | 8.5 denier |
| Draw ratio | 28.0 |
| Strength | 1.68 GPa |

| TABLE 4-continued | |
|---|---|
| Elastic modulus | 45.5 GPa |
| Elongation | 6.3% |

FIG. 2 shows a melting characteristic curve of the obtained filament (sample 2). The adhesive force was measured according to the method described in Evaluation of Adhesiveness in Example 1, and the obtained results are shown in FIG. 7 together with the results obtained in Example 1. The creep characteristic was measured according to the method described in Evaluation of Creep Characteristic in Example 1. The results obtained under a load of 500 MPa are shown in FIG. 8, and the results obtained under a load corresponding to 30% of the breaking load are shown in FIG. 9. At the measurement of the creep characteristic conducted according to the method described in Example 1 (at an ambient temperature of 70° C. under a load corresponding to 50% of the breaking load at room temperature), the sample was broken just after application of the load.

FIG. 2 shows a DSC melting characteristic curve of the obtained filament at the first temperature elevation. The inherent crystal melting temperature determined as the temperature of the main melting peak at the second temperature elevation was 132.2° C., and the ratio of the melting calorific value based on Tp to the total crystal melting calorific value and the ratio of the melting calorific value based on Tp1 to the total crystal melting calorific value were 32.1% and 1.7%, respectively.

Figure 11:
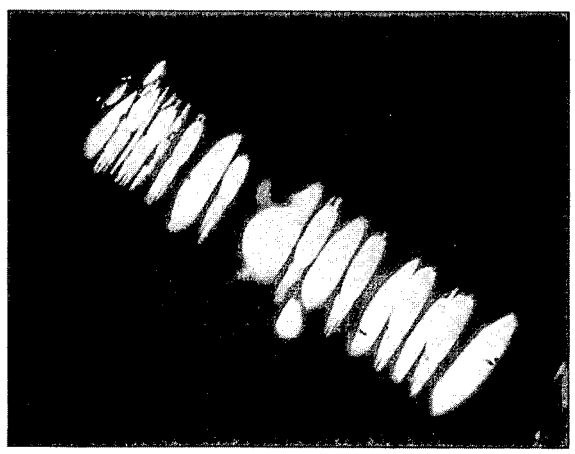
FIG. 11 is a polarization microscope photograph illustrating the presence of a crystal structure at 150° C. in the ultra-high-molecular-weight polyethylene filament obtained in Comparative Example 1.

The strength retention ratio after the heat history was determined according to the method described in Strength Retention Ratio after Heat History in Example 1. At an oven temperature of 180° C., the sample was completely molten for a standing time shorter than 10 minutes. The crystal melting was observed under polarization by a microscope according to the method described in Observation of Crystal Melting by Polarization Microscope in Example 1. The presence of a crystal was confirmed at 150° C. (FIG. 11), but the field of vision became dark at about 180° C.

COMPARATIVE EXAMPLE 2

Preparation of Silane-Crosslinked Drawn Polyethylene Filament

100 Parts by weight of polyethylene powder (density32 0.955 g/cm³, intrinsic viscosity $(\eta)=2.30$ dl/g, was uniformly mixed with the vinyltrimethoxysilane, peroxide and paraffin wax powder described in Example 1 in amounts of 10 parts by weight, 0.1 part by weight and 33 parts by weight, respectively. In the same manner as described in Example 1, the composition was spun from a die having an orifice diameter of 1 mm to obtain an undrawn filament having a fineness of 1800 denier. The amount of the grafted silane compound was 1.23% by weight as the content of Si. Subsequently, in the same manner as described in Example 1, the filament was drawn, impregnated with the catalyst and crosslinked. The physical properties of the obtained filament are shown in Table 5.

TABLE 5

| Sample | sample 3 |
|---|---|
| Fineness | 65.5 denier |
| Draw ratio | 20.6 |
| Gel proportion | 79.4% |
| Strength | 0.75 GPa |
| Elastic modulus | 10.0 GPa |

| TABLE 5-continued | |
|---|---|
| Elongation | 8.9% |

The strength retention ratio after the heat history was determined according to the method described in Strength Retention Ratio after Heat History in Example 1. The obtained results are shown in Table 6.

TABLE 6

| Sample | sample 3 |
|---|---|
| Oven temperature | 160° C. |
| Standing time | 10 minutes |
| Strength | 0.42 GPa |
| Strength retention ratio | 56% |
| Elastic modulus | 3.3 GPa |
| Elastic modulus retention ratio | 3.3% |
| Elongation | 17.0% |
| Elongation retention ratio | 191% |

At the heat history at 180° C., the sample was molten for a standing time shorter than 10 minutes. Since the molecular weight of the sample was lower than that of sample 1 of Example 1, the strength was lower and the strength retention ratio after the heat history was lower.

Figure 12:
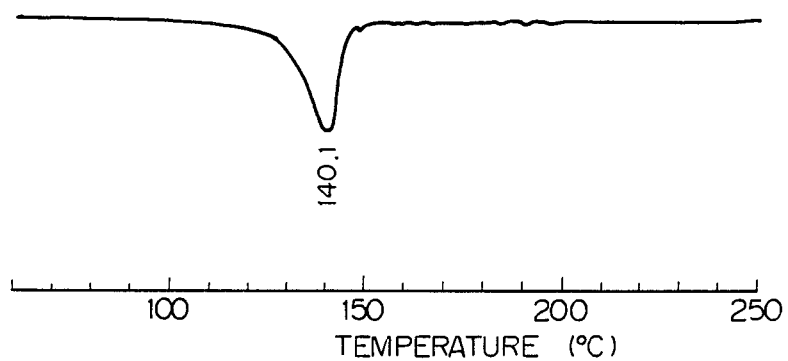
FIG. 12 is a graph illustrating the melting characteristics of the molecularly oriented, silane-crosslinked polyethylene filament obtained in Comparative Exmple 2.

When the creep characteristic was determined according to the method described in Example 1 (ambient temperature=70° C., load=50% of breaking load at room temperature), the sample was broken just after application of the load. FIG. 12 shows a DSC melting characteristic curve of the sample at the first temperature elevation. The inherent crystal melting temperature Tm determined as the temperature of the main melting peak at the second temperature elevation was 128.0° C. The ratio of the melting calorific value based on Tp to the total crystal melting calorific value and the ratio of the melting calorific value based on Tp1 to the total crystal melting calorific value were 47% and 9.5%, respectively.

When the creep test was carried out at an ambient temperature of 70° C. under a load corresponding to 50% of the breaking load at room temperature according to the method described in Example 1, the sample was broken just after application of the load.

COMPARATIVE EXAMPLE 3

Preparation of Peroxide-Crosslinked, Drawn Filament

The paraffin wax was extracted from the undrawn yarn described in Comparative Example 1 by using excess of hexane, and the undrawn yarn was dried at room temperature under reduced pressure. Subsequently, the undrawn yarn was impregnated with a 20% by wieght solution of dicumyl peroxide (Mitsui DCP supplied by Mitsui Petrochemical) in acetone and was then dried at room temperature under reduced pressure. The content of dicumyl peroxide as determined according to the weight method was 0.51% by weight.

Subsequently, the undrawn yarn was subjected to two-staged drawing using three goddet rollers in an infrared furnace (Gold Image Furnace RHL-E461 supplied by Shinku Riko) as a drawing tank. The temperature in the first drawing zone was 110° C. and the temperature in the second drawing zone was 145° C. The effective length of each drawing zone was 42 cm. At the drawing operation, the rotation speed of the first goddet roller was set at 0.5 m/min and the intended draw was obtained by adjusting the rotation speed of the third goddet roller. The rotation speed of the second goddet roller was appropriately selected within the range where the drawing operation could be performed stably. The draw ratio was calculated from the rotation speed ratio between the first and third goddet rollers. The physical properties of the obtained filament are shown in Table 7.

TABLE 7

| Sample | sample 4 |
| --- | --- |
| Fineness | 12 denier |
| Draw ratio | 19.8 |
| Gel proportion | 5.4% |
| Strength | 0.57 GPa |
| Elastic modulus | 17.1 GPa |
| Elongation | 7.9% |

The inherent crystal melting temperature Tm determined as the main melting peak at the second temperature elevation was 133.1° C., and the ratio of the melting calorific value based on Tp to the total crystal melting calorific value and the ratio of the melting calorific value based on Tp1 to the total crystal melting calorific value were 73% and 2%, respectively. The strength retention ratio after the heat history was determined according to the method described in Strength Retention Ratio after Heat History in Example 1. After the heat history at 180° C. for 10 minutes, the filament was fused though the shape of the filament was retained.

EXAMPLE 2

In 100 parts by weight of ultra-high-molecular-weight polyethylene powder (intrinsic viscosity ($\eta$)=8.20 dl/g) were uniformly incorporated 10 parts by weight vinyltris(methoxyethoxy)silane (supplied by Shinetsu Kagaku) and 0.1 part by weight of 2,5-dimethyl-2,5-di(tert-butylperoxy)hexane (Perhexa 25B supplied by Nippon Yushi), and paraffin wax powder (Luvax 1266 supplied by Nippon Seiro and having a melting point of 69° C.) was added in an amount 235 parts by weight per 100 parts by weight of the ultra-high-molecular-weight polyethylene. Then, the resulting mixture was melt-kneaded at a set temperature of 250° C. by using a screw type extruder (screw diameter=20 mm, L/D=25) to effect grafting, and in the same manner as described in Example 1, the kneaded mixture was spun, drawn and crosslinked to obtain a silane-crosslinked, drawn ultra-high-molecular-weight polyethylene filament. The physical properties of the obtained filament are shown in Table 8.

TABLE 8

| Sample | sample 5 |
| --- | --- |
| Fineness | 11.6 denier |
| Draw ratio | 18 |
| Strength | 1.49 GPa |
| Elastic modulus | 31.1 GPa |
| Elongation | 7.2% |

Figure 13:
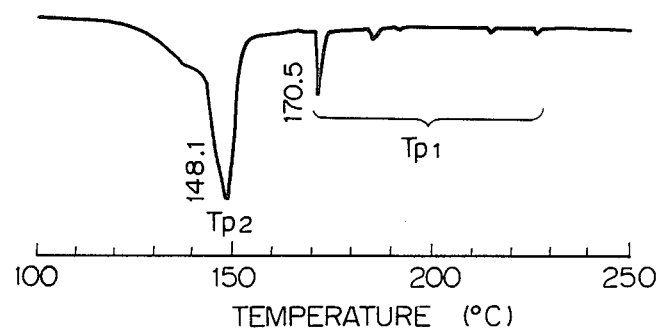
FIG. 13 is a graph illustrating the melting characteristics of the molecularly oriented, silane-crosslinked ultra-high-molecular-weight polyethylene filament obtained in Example 2.

The inherent crystal melting temperature Tm of the ultra-high-molecular-weight polyethylene determined as the main melting peak at the second temperature elevation was 132.1° C., and the ratio of the melting calorific value based on Tp to the total crystal melting calorific value and the ratio of the melting calorific value based on Tp1 to the total crystal melting calorific value were 59% and 11%, respectively. The peak temperature Tp2 was 148.1° C., and the temperature of the main component of Tp1 was 170.5° C. FIG. 13 shows a melting characteristic curve at the first temperature elevation. The amount of the grafted silane as determined according to the method described in Example 1 (the content (% by weight) of Si), the gel proportion and the tensile characteristic retention ratios are shown in Tables 9 and 10.

TABLE 9

| Sample | sample 5 |
| --- | --- |
| Amount of grafted silane | 0.33% |
| Gel proportion | 48.3% |

TABLE 10

| Sample | sample 5 |
| --- | --- |
| Oven temperature | 180° C. |
| Standing time | 10 minutes |
| Strength | 1.2 GPa |
| Strength retention ratio | 86% |
| Elastic modulus | 18.3 GPa |
| Elastic modulus retention ratio | 59% |
| Elongation | 10.4 |
| Elongation retention ratio | 145% |

The creep test was carried out at 70° C. under a load corresponding to 50% of the breaking load at room temperature in the same manner as described in Example 1. The elongation was measured 1 minute, 2 minutes and 3 minutes after application of the load. The obtained results are shown in Table 11.

TABLE 11

| Sample | Time (minutes) | Elongation (%) |
| --- | --- | --- |
| sample 5 | 1 | 10.8 |
| " | 2 | 12.6 |
| " | 3 | 13.8 |

The orientation degree determined according to the method described in Example 1 was 0.950.

EXAMPLE 3

In 100 parts by weight of ultra-high-molecular-weight polyethylene (intrinsic viscosity ($\eta$)=15.5 dl/g) were uniformly incorporated 3 parts by weight of vinyltriethoxysilane (supplied by Shinetsu Kagaku) and 0.1 part by weight of 2,5-dimethyl-2k5-di(tertbutylperoxy)hexane (Perhexa 25B supplied by Nippon Yushi), and paraffin wax powder (Luvax 1266 supplied by Nippon Seiro and having a melting point of 69° C.) was added in an amount of 400 parts by weight per 100 parts by weight of the ultra-high-molecular-weight polyethylene. The resulting mixture was melt-kneaded at a set temperature of 250° C. by a screw type extruder (screw diameter=20 mm, L/D=25) to effect grafting. Subsequently, in the same manner as described in Example 1, spinning, drawing and crosslinking were carried out to obtain a silane-crosslinked, drawn ultra-high-molecular-weight polyethylene filament having the physical properties shown in Table 1.

TABLE 12

| Sample | sample 6 |
| --- | --- |
| Fineness | 17.6 denier |
| Draw ratio | 16.0 |
| Strength | 2.00 GPa |
| Elastic modulus | 50.88 GPa |
| Elongation | 5.02% |

Figure 14:
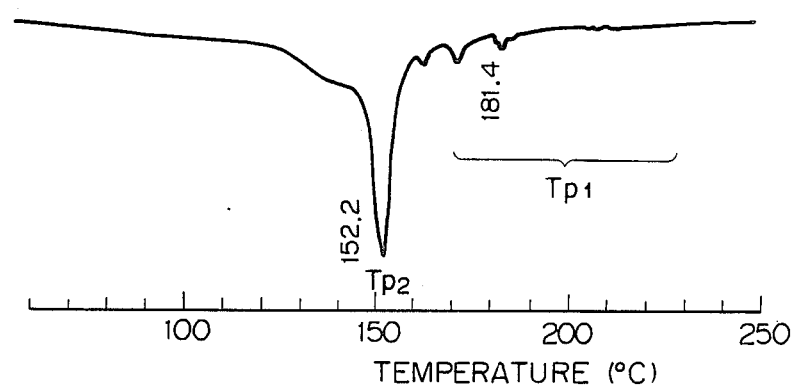
FIG. 14 is a graph illustrating the melting characteristics of the molecularly oriented, silane-crosslinked ultra-high-molecular-weight polyethylene filament obtained in Example 3.

The inherent crystal melting temperature Tm of the ultra-high-molecular-weight polyethlene determined as the main melting peak at the second temperature elevation was 133.7° C., and the ratio of the melting calorific value based on Tp to the total crystal melting calorific value and the ratio of the melting calorific value based on Tp1 to the total crystal melting calorific value were 64.7% and 12.4%, respectively. The temperature of Tp2 was 152.2° C., and the temperature of the main component of Tp1 was 181.4° C. FIG. 14 shows a DSC melting characteristic curve at the first temperature elevation. The amount of the grafted silane (the content (% by weight) of Si) determined according to the method described in Example 1, the gel proportion and the tensile characteristic retention ratios are shown in Tables 13 and 14.

TABLE 13

| Sample | sample 6 |
|---|---|
| Amount of grafted silane | 0.068% |
| Gel proportion | 71.6% |

TABLE 14

| Sample | sample 6 |
|---|---|
| Oven temperature | 160° C. |
| Standing time | 10 minutes |
| Strength | 1.14 GPa |
| Strength retention ratio | 57.1% |
| Elastic modulus | 24.18 GPa |
| Elastic modulus retention ratio | 48.0% |
| Elongation | 6.66 |
| Elongation retention ratio | 133% |

The creep test was carried out at an ambient temperature of 70° C. under a load corresponding to 50% of the breaking load at room temperature in the same manner as described in Example 1. The elongation was measured 1 minute, 2 minutes and 3 minutes after application of the load. The obtained results are shown in Table 15.

TABLE 15

| Sample | Time (minutes) | Elongation (%) |
|---|---|---|
| sample 6 | 1 | 9.8 |
| " | 2 | 11.0 |
| " | 3 | 12.0 |

The orientation degree determined according to the method described in Example 1 was 0.964.

EXAMPLE 4

In 100 parts by weight of ultra-high-molecular-weight polyethylene powder (intrinsic viscosity ($\eta$)=8.20 dl/g) were uniformly incorporated 5 parts by weight vinyltriethoxysilane (supplied by Shinetsu Kagaku) and 0.05 part by weight of dicumyl peroxide (Percumyl P supplied by Nippon Yushi), and paraffin wax powder (Luvax 1266 supplie by Nippon Seiro and having a melting point of 69° C.) was added in an amount of 400 parts by weight per 100 parts by weight of the ultra-high-molecular-weight polyethylene. The resulting mixture was melt-kneaded at a set temperature of 230° C. by a screw type extruder (screw diameter=20 mm, L/D=25) to effect grafting. Subsequently, in the same manner as described in Example 1, spinning drawing and crosslinking were carried out to obtain a silane-crosslinked, drawn ultra-high-molecular-weight polyethylene filament having the physical properties shown in Table 16.

TABLE 16

| Sample | sample 7 |
|---|---|
| Fineness | 9.1 denier |
| Draw ratio | 11.19 |

TABLE 16-continued

| Sample | sample 7 |
|---|---|
| Strength | 2.14 GPa |
| Elastic modulus | 43.14 GPa |
| Elongation | 5.85% |

Figure 15:
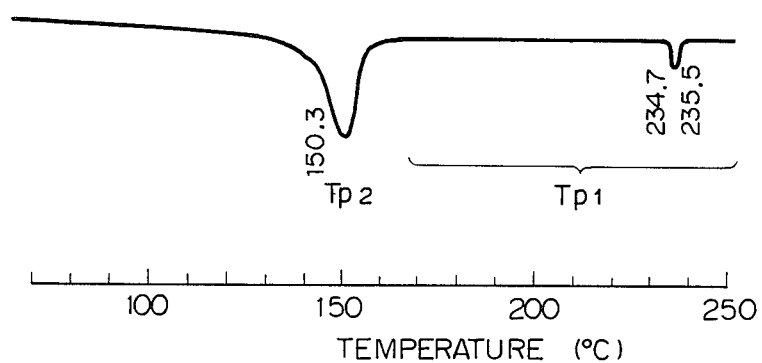
FIG. 15 is a graph illustrating the melting characteristics of the molecularly oriented, silane-crosslinked ultra-high-molecular-weight polyethylene filament obtained in Example 4.

The inherent crystal melting temperature Tm of the ultra-high-molecular-weight polyethylene determined as the main melting peak at the second temperature elevation by a differential scanning calorimeter was 133.2° C., and the ratio of the melting calorific value based on Tp to the total crystal melting calorific value and the ratio of the melting calorific value based on Tp1 to the total crystal melting calorific value were 71.5% and 19.0%, respectively. Tp2 was 150.3° C. and the temperature of the main component of Tp1 was 234.7° C. FIG. 15 shows a DSC melting characteristic curve at the first temperature elevation. The amount of the grafted silane (the content (% by weight) of Si), the gel proportion and the tensile characteristic retention ratios are shown in Tables 17 and 18.

TABLE 17

| Sample | sample 7 |
|---|---|
| Amount of grafted silane | 0.044% |
| Gel proportion | 94.9% |

TABLE 18

| Sample | sample 7 |
|---|---|
| Oven temperature | 180° C. |
| Standing time | 10 minutes |
| Strength | 1.44 GPa |
| Strength retention ratio | 67% |
| Elastic modulus | 24.14 GPa |
| Elastic modulus retention ratio | 56% |
| Elongation | 7.30% |
| Elongation retention ratio | 125% |
| Sample | sample 7 |
| Oven temperature | 160° C. |
| Standing time | 10 minutes |
| Strength | 1.53 |
| Strength retention ratio | 71% |
| Elastic modulus | 28.81 GPa |
| Elastic modulus retention ratio | 67% |
| Elongation | 6.90% |
| Elongation retention ratio | 118% |

The creep test was carried out at an ambient temperature of 70° C. under a load corresponding to 50% of the breaking load at room temperature in the same manner as described in Example 1. The elongation was measured 1 minute, 2 minutes and 3 minutes after application of the load. The obtained results are shown in Table 19.

TABLE 19

| Sample | Time (minutes) | Elongation (%) |
|---|---|---|
| sample | 1 | 11.0 |
| ditto | 2 | 12.0 |
| ditto | 3 | 13.0 |

EXAMPLE 5

In 100 parts by weight of ultra-high-molecular-weight polyethylene powder (intrinsic viscosity ($\eta$)=8.20 dl/g) were uniformly incorporated 5 parts by weight of vinyltriethoxysilane (supplied by Shinetsu Kagaku) and 0.05 part by weight of 2,5-dimethyl-2,5- di(tertbutylperxoy)hexine-3 (Perhexine 25B supplied by Nippon Yushi), and paraffin wax powder (Luvax 1266 supplied by Nippon Seiro and having a melting point of 69° C.) was added in an amount of 400 parts by weight per 100 parts by weight of the ultra-high-molecular-weight polyethylene. The resulting mixture was melt-kneaded at a set temperature of 200° C. by a screw type extruder (screw diameter=20 mm, L/D=25) to effect grafting. Subsequently, spinning, drawing and cross-linking were carried out in the same manner as described in Example 1 to obtain a silane-crosslinked, drawn ultra-high-molecular-weight polyethylene filament having the physical properties shown in Table 20.

TABLE 20

| Sample | sample 8 |
| --- | --- |
| Fineness | 6.4 denier |
| Draw ratio | 16.74 |
| Strength | 3.34 GPa |
| Elastic modulus | 74.32 GPa |
| Elongation | 5.87% |

Figure 16:
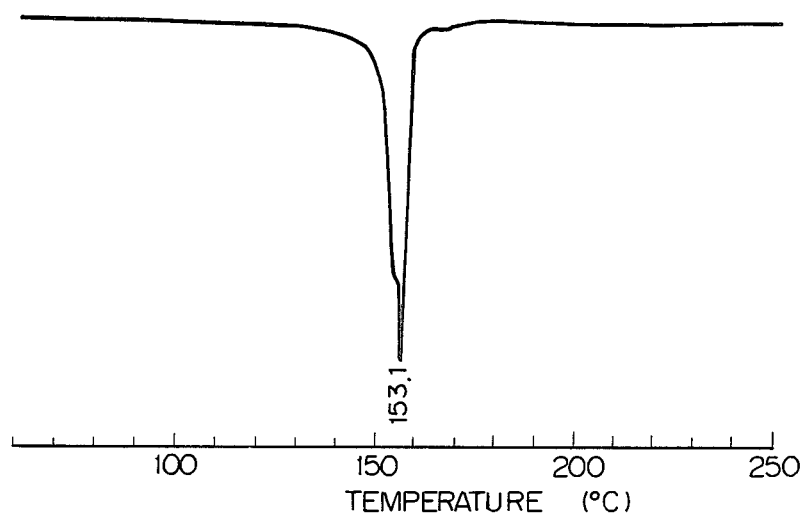
FIG. 16 is a graph illustrating the melting characteristics of the molecularly oriented, silane-crosslinked ultra-high-molecular-weight polyethylene filament obtained in Example 5.

The inherent crystal melting temperature Tm of the ultra-high-molecular-weight polyethylene determined as the main melting peak at the second temperature elevation was 133.6° C., and the ratio of the melting calorific value based on Tp to the total crystal melting calorific value and the ratio of the melting calorific value based on Tp1 to the total crystal melting calorific value were 76.2% and 6.2%, respectively. Tp2 was 153.1° C. and no main peak of Tp1 was observed but a shoulder of Tp2 extended to the high temperature side from Tm+35° C. was observed. FIG. 16 shows an endothermic characteristic curve at the first temperature elevation.

The amount of the grafted silane measured according to the method described in Example 1, the gel proportion and the tensile characteristic retention ratios are shown in Tables 21 and 22.

TABLE 21

| Sample | sample 8 |
| --- | --- |
| Amount of grafted silane | 0.013% |
| Gel proportion | 42.5% |

TABLE 22

| Sample | sample 8 |
| --- | --- |
| Oven temperature | 160° C. |
| Standing time | 10 minutes |
| Strength | 2.31 GPa |
| Strength retention ratio | 68% |
| Elastic modulus | 49.11 GPa |
| Elastic modulus retention ratio | 66% |
| Elongation | 5.82% |
| Elongation retention ratio | 99% |

The creep test was carried out at an ambient temperature of 70° C. under a load corresponding to 50% of the breaking load at room temperature in the same manner as described in Example 1. The elongation was measured 1 minute, 2 minutes and 3 minutes after application of the load. The obtained results are shown in Table 23.

TABLE 23

| Sample | Time (minutes) | Elongation (%) |
| --- | --- | --- |
| sample 8 | 1 | 8.4 |
| ditto | 2 | 10.4 |

TABLE 23-continued

| Sample | Time (minutes) | Elongation (%) |
| --- | --- | --- |
| ditto | 3 | 12.8 |

The orientation degree determined according to the method described in Example 1 was 0.980.

EXAMPLE 6

In 100 parts by weight of ultra-high-molecular-weight polyethylene powder (intrinsic viscosity (η) =8.20 dl/g) were uniformly incorporated 1 part by weight of vinyltriethoxysilane (supplied by Shinetsu Kagaku) and 0.05 part by weight of 2,5-dimethyl-2,5-di(tertbutylperoxy)hexine-3 (Perhexine 25B supplied by Nippon Yushi), and paraffin wax powder (Luvax 1266 supplied by Nippon Seiro and having a melting point of 69° C.) was added in an amount of 400 parts by weight per 100 parts by weight of the ultra-high-molecular-weight polyethylene. The resulting mixture was melt-kneaded by a screw type extruder (screw diameter=20 mm, L/D=25) at a set temperature of 230° C. to effect grafting. Subsequently, spinning, drawing and cross-linking were carried out in the same manner as described in Example 1 to obtain a silane-crosslinked, drawn ultra-high-molecular-weight polyethylene having the physical properties shown in Table 24.

TABLE 24

| Sample | sample 9 |
| --- | --- |
| Fineness | 5.6 denier |
| Draw ratio | 23.50 |
| Strength | 3.22 GPa |
| Elastic modulus | 80.26 GPa |
| Elongation | 4.75% |

The inherent crystal melting point Tm of the ultra-high-molecular-weight polyethylene determined as the main melting peak at the second temperatuire elevation by a differential scanning calorimeter was 134.4° C., and the ratio of the melting calorific value based on Tp to the total crystal melting calorific value and the ratio of the melting calorific value based on Tp1 to the total crystal melting calorific value were 75.4% and 8.3%, respectively. Tp2 was 154.0° C. No main peak of Tp1 was observed but a shoulder peak of Tp2 extending to the high temperature side from Tm+25° C. was observed.

The amount of grafted silane compound (Si content, % by weight), measured according to the method described in Example 1, the gel proportion and the tensile characteristic retention ratios are shown in Tables 25 and 26.

TABLE 25

| Sample | sample 9 |
| --- | --- |
| Amount of grafted silane | 0.015% |
| Gel proportion | 77.6% |

TABLE 26

| Sample | sample 9 |
| --- | --- |
| Oven temperature | 160° C. |
| Standing time | 10 minutes |
| Strength | 2.87 GPa |
| Strength retention ratio | 89% |
| Elastic modulus | 69.02 GPa |
| Elastic modulus retention ratio | 86% |
| Elongation | 5.13% |

TABLE 26-continued

| Elongation retention ratio | 108% |
| --- | --- |
| Sample | sample 9 |
| Oven temperature | 180° C. |
| Standing time | 10 minutes |
| Strength | fused |
| Elastic modulus | fused |
| Elongation | fused |

The creep test was carried out at an ambient temperature of 70° C. under a load corresponding to 50% of the brieking load at room temperature in the same manner as described in Example 1. The elongation was measured 1 minute, 2 minutes and 3 minutes after application of the load. The obtained results are shown in Table 27.

TABLE 27

| Sample | Time (minutes) | Elongation (%) |
| --- | --- | --- |
| sample 9 | 1 | 7.4 |
| ditto | 2 | 11.0 |
| ditto | 3 | 14.6 |

COMPARATIVE EXAMPLE 4

In 100 parts by weight of ultra-high-molecular-weight polyethylene powder (intrinsic viscosity ($\eta$)=8.20 dl/g) was incorporated 235 parts of paraffin wax (Luvax 1266 supplied by Nippon Seiro and having a melting point of 69° C.), and the mixture was melt-kneaded at a set temperature of 200° C. by a screw type extruder (screw diameter=20 mm, L/D=25) and spun. The draft ratio at the spinning operation was 31 and the winding speed as 15 m/min, and the fineness of the obtained undrawn yarn was about 1000 denier. Subsequently, the undrawn yarn was subjected to two-staged drawing in a drawing tank provided with 4 goddet rollers and filled with n-decalin as the heat medium and then drawn in one stage (three stages as a whole) in triethylene glycol. The temperature of the first drawing zone was 110° C., the temperature of the second drawing zone was 120° C. and the temperature of the third drawing zone was 140° C., and the length of each drawing zone was 50 cm. At the drawing operation, the rotation speed of the first goddet roller was set at 0.5 m/min and the desired draw ratio was obtained by changing the rotation speed of the fourth goddet roller. The rotation speeds of the second and third goddet rollers were appropriately selected within the range where the drawing could be carried out stably. The draw ratio was calculated from the rotation ratio between the first and third goddet rollers. The physical properties of the obtained filament are shown in Table 28.

TABLE 28

| Sample | sample 10 |
| --- | --- |
| Fineness | 8.0 denier |
| Draw ratio | 25.0 |
| Strength | 2.29 GPa |
| Elastic modulus | 82.0 GPa |
| Elongation | 4.11% |

The inherent crystal melting temperature Tm of the ultra-high-molecular-weight polyethylene determined as the main melting peak at the second temperature elevation was 133.1° C., and the ratio of the melting calorific value based on Tp to the total crystal melting calorific value and the ratio of the melting calorific value based on Tp1 to the total crystal melting calorific value were 72.0% and 2.2%, respectively. Tp2 was 155.0° C. The tensile characteristic retention ratios were determined according to the method described in Example 1. The obtained results are shown in Table 29.

TABLE 29

| Sample | sample 10 |
| --- | --- |
| Oven temperature | 160° C. |
| Standing time | 10 minutes |
| Strength | 2.10 GPa |
| Strength retention ratio | 92% |
| Elastic modulus | 71.22 GPa |
| Elastic modulus retention ratio | 87% |
| Elongation | 4.24% |
| Elongation retention ratio | 103% |
| Sample | sample 10 |
| Oven temperature | 180° C. |
| Standing time | 10 minutes |
| Strength | fused |
| Elastic modulus | fused |
| Elongation | fused |

The creep test was carried out at an ambient temperature of 70° C. under a load corresponding to 50% of the breaking load at room temperature in the same manner as described in Example 1. After 50 seconds from the point of application of the load, the filament was elongated by 49% and fused.

COMPARATIVE EXAMPLE 5

Vinyltrimethoxysilane described in Example 1 and dicumyl peroxide (Mitsui DCP supplied by Mitsui Petrochemical) were incorporated in amounts of 1.0 part by weight and 0.03 part by weight, respectively, into 100 parts by weight of the same polyethylene powder as used in Comparative Example 2, and the mixture was granulated at a set temperature of 185° C. by an extruder having a screw diameter of 20 mm to obtain a grafted pellet. Separately, 100 parts by weight of the same polyethylene powder as used in Comparative Example 2 was uniformly mixed with 1.0 part by weight of dibutyl tin dilaurate and the mixture was granulated at a set temperature of 190° C. in the same manner as described above to obtain a crosslinking catalyst master batch. Then, 95 parts by weight of the grafted pellet was uniformly mixed with 5 parts by weight of the crosslinking catalyst master batch and spinning of the mixture by a spinning machine provided with a screw having a diameter of 25 mm at a set temperature 270° C. was tried. However, the polyethylene was solidified in the spinning machine and spinning was impossible.

COMPARATIVE EXAMPLE 6

The silane-grafted pellet prepared in Comparative Example 5 was spun by a melt tension tester (supplied by Toyo Seiki) to obtain a grafted, undrawn yarn. The nozzle diameter was 2 mm and the set temperature was 250° C. The undrawn yarn was drawn under conditions described below to obtain an oriented drawn filament. Drawing was carried in a drawing tank provided with three goddet rollers and filled with triethylene glycol as the heat medium. The temperature in the drawing tank was 102° C. and the effective length of the drawing tank was 50 cm. The rotation speed of the feed goddet roller was 0.5 m/min, and the draw ratio was set according to the method described in Example 1. The obtained drawn filament was washed with warm water and dried at room temperature.

Then, the drawn yarn was immersed in a 30% by weight solution of dibutyl tin dilaurate in n-decane under a reduced pressure of 70 cmHg to impregnate the yarn with the crosslinking catalyst. The obtained crosslinking catalyst-impregnated, grafted, drawn filament was allowed to stand still over a whole day and night in boiling water to complete water-crosslinking. The physical properties of the obtained silane-crosslinked, drawn polyethylene filament are shown in Table 30.

TABLE 30

| Sample | sample 11 |
|---|---|
| Fineness | 1071 denier |
| Draw ratio | 15.0 |
| Strength | 0.29 GPa |
| Elastic modulus | 3.16 GPa |
| Elongation | 20.6% |

The inherent crystal melting temperature Tm of the polyethylene determined as the main melting peak at the second temperature elevation by a differential scanning calorimeter was 131.5° C., and the ratio of the melting calorific value based on Tp to the total crystal melting calorific value and the ratio of the melting calorific value based on Tp1 to the total crystal melting calorific value were 6.4% and 0%, respectively. Even if crosslinking, drawing and orientation were effected, the inherent crystal melting temperature Tm of the polyethylene could not be elevated, and no main peak could be formed in the region of Tp2. Even a trace of a peak or shoulder attributed to melting was not found in the region of Tp1. Sub-peaks inherent to the molded article of the present invention were not observed in the exothermic characteristic curve at the recrystallization for transfer to the second temperature elevation or the endothermic characteristic curve at the second temperature elevation (second run).

Figure 17:
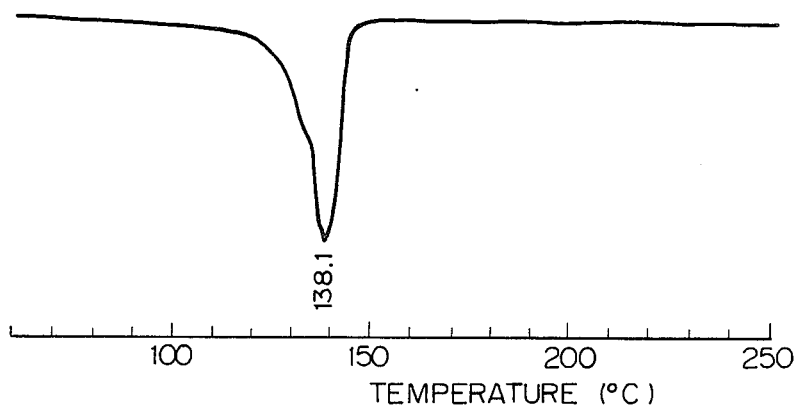
FIG. 17 is a graph illustrating the melting characteristics of the molecularly oriented, silane-crosslinked polyethylene filament obtained in Comparative Example 6.
Figure 18:
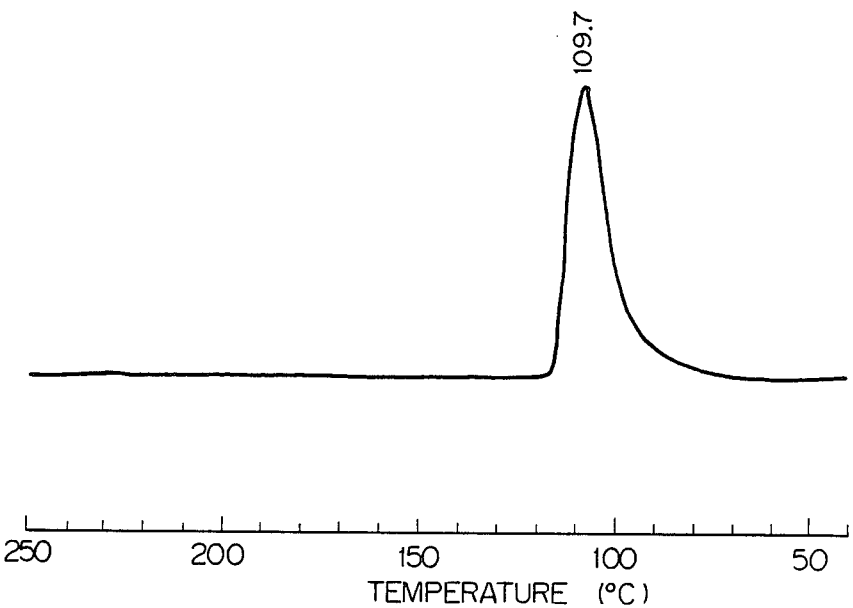
FIG. 18 is a graph illustrating the crystallizing characteristics of the sample shown in FIG. 17.
Figure 19:
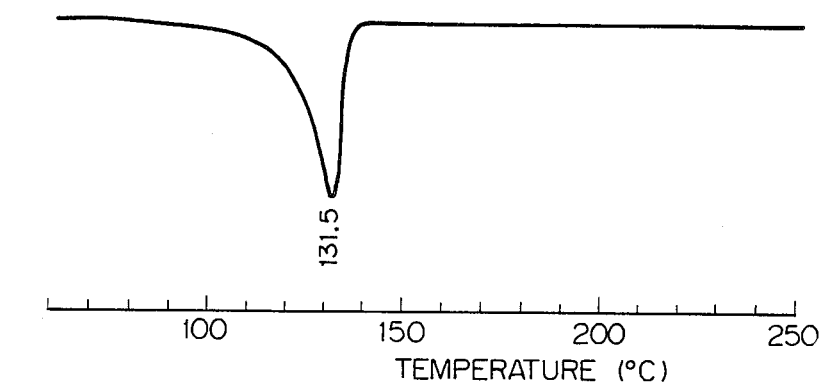
FIG. 19 is a graph illustrating the melting characteristics observed when the sample shown in FIG. 17 is subjected to the second temperature elevation measurement.

The endothermic characteristic curve at the first temperature elevation, the exothermic characteristic curve in the course for transfer to the second temperature elevation and the endothermic characteristic curve at the second temperature elevation are shown in FIGS. 17, 18 and 19, respectively. As is seen from FIGS. 17 through 19, a characteristic peak or shoulder on the high temperature side, corresponding to the main peak observed in the drawn molded article of the present invention, was not observed in the drawn molded article of this Comparative Example.

The gel proportion determined according to the method described in Example 1 was 3.5%. The obtained filament was fused at 140° C. and the tensile characteristics could not be retained at high temperatures.

We claim:

1. A molecularly oriented, silane-crosslinked ultra-high-molecular-weight polyethylene molded article, wherein when the molded article is analyzed in the constrained state by a differential scanning calorimeter, at least two crystal-melting peaks (Tp) appear at temperatures higher by at least 10° C. than the inherent crystal-melting temperature (Tm) of the ultra-high-molecular-weight polyethylene obtained as the main melting peak at the second temperature elevation and the melting calorific value of the crystal-melting peaks (Tp) is at least 50% of the total melting calorific value, and the sum of calorific values of high temperature side melting peaks (Tp1) appearing at temperatures in the range of from (Tm+35° C.) to (Tm+120° C.) is at least 5% of the total melting calorific value.

2. A molded article as set forth in claim 1, wherein the heat-resistant creep characteristic of the molded article is such that if the molded article is placed at 70° C. under a load corresponding to 30% of the breaking load at room temperature, the molded article is not broken for at least 1 minute.

3. A molded article as set forth in claim 1, wherein after the molded article is heated at 180° C. for 10 minutes, the molded article has a strength retention ratio of at least 60%.

4. A molded article as set forth in claim 1, wherein the molded article contains a grafted silane in an amount of 0.01 to 5% by weight as the content of Si based on the ultra-high-molecular-weight polyethylene.

5. A molded article as set forth in claim 1, which is in the form of a filament.

6. A molded article as set forth in claim 5, wherein the orientation degree (F) is at least 0.90.

7. A molded article as set forth in claim 5, wherein the elasticity modulus is at least 20 GPa and the tensile strength is at least 1.2 GPa.

8. A molded article as set forth in claim 1 wherein the ultra-high-molecular-weight polyethylene has an intrinsic viscosity of from 7 to 30 dl/g as measured at 135° C. in decalin.

9. A molded article as set forth in claim 1, which is in the form of a film, sheet or tape.

10. A molded article as set forth in claim 1 wherein the sum of calorific values of high temperature side melting peaks (Tp1) appearing at temperatures in the range of from (Tm+35° C.) to (Tm+120° C.) is at least 10% of the total melting calorific value.

11. A molecularly oriented, silane-crosslinked ultra-high-molecular-weight polyethylene molded article said article being obtained by spinning a silane-grafted ultra-high-molecular-weight polyethylene into a filament, drawing the grafted filament and then crosslinking the drawn grafted filament; wherein said ultra-high-molecular-weight polyethylene has an intrinsic viscosity ($\eta$) of at least 5 dl/g and said article contains the grafted silane in an amount of 0.01 to 5% by weight as the content of Si based on the ultra-high-molecular-weight polyethylene; said article having at least two crystal-melting peaks (Tp) appearing at temperatures higher by at least 10° C. than the inherent crystal-melting temperature (Tm) of the ultra-high-molecular-weight polyethylene obtained as the main melting peak at the second temperature elevation, when the molded article is analyzed in the constrained state by a differential scanning calorimeter, the melting calorific value of the crystal-melting peaks (Tp) is at least 50% of the total melting calorific value, the sum of calorific values of high temperature side melting peaks (Tp1) appearing at temperatures in the range of from (Tm+35° C.) to (Tm+120° C.) is at least 5% of the total melting calorific value, and said article having an elasticity of at least 20 GPa, a tensile strength of at least 1.2 GPa and a strength retention ratio of at least 60% after the article is heated at 180° C. for 10 minutes.

* * * * *